United States Patent
Son et al.

(10) Patent No.: US 12,443,086 B2
(45) Date of Patent: Oct. 14, 2025

(54) LIGHT ROUTE CONTROL MEMBER AND DISPLAY DEVICE COMPRISING SAME

(71) Applicant: LG INNOTEK CO., LTD., Seoul (KR)

(72) Inventors: Mun Yeong Son, Seoul (KR); Byung Sook Kim, Seoul (KR); Jin Gyeong Park, Seoul (KR); Jong Sik Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 674 days.

(21) Appl. No.: 17/753,966

(22) PCT Filed: Sep. 3, 2020

(86) PCT No.: PCT/KR2020/011848
§ 371 (c)(1),
(2) Date: Mar. 18, 2022

(87) PCT Pub. No.: WO2021/054656
PCT Pub. Date: Mar. 25, 2021

(65) Prior Publication Data
US 2022/0342273 A1  Oct. 27, 2022

(30) Foreign Application Priority Data

Sep. 18, 2019  (KR) .................. 10-2019-0114929
Oct. 10, 2019  (KR) .................. 10-2019-0125374

(51) Int. Cl.
*G02F 1/167*  (2019.01)
*G02F 1/13*  (2006.01)
(Continued)

(52) U.S. Cl.
CPC ............ *G02F 1/167* (2013.01); *G02F 1/1323* (2013.01); *G02F 1/133512* (2013.01);
(Continued)

(58) Field of Classification Search
CPC ...... G02F 1/167; G02F 1/1675; G02F 1/1681; G02F 1/1685; G02F 1/165; G02F 1/1323;
(Continued)

(56) References Cited

U.S. PATENT DOCUMENTS 7,535,539 B2  5/2009  Sakurai et al.
9,389,481 B2  7/2016  Myoung et al.
(Continued)

FOREIGN PATENT DOCUMENTS

CN  102323699 A  1/2012
CN  107621722 A  1/2018
(Continued)

OTHER PUBLICATIONS

International Search Report dated Dec. 15, 2020 in International Application No. PCT/KR2020/011848.
(Continued)

*Primary Examiner* — Angela M. Medich
(74) *Attorney, Agent, or Firm* — Saliwanchik, Lloyd & Eisenschenk

(57) ABSTRACT

An optical path control member, according to an embodiment, comprises: a first substrate; a first electrode disposed on an upper surface of the first substrate; a second substrate disposed on the first substrate; a second electrode disposed on a lower surface of the second substrate; and an optical conversion unit disposed between the first electrode and the second electrode, wherein the optical conversion unit includes partition wall parts and accommodation parts which are alternately disposed, the accommodation parts have a light transmission rate that varies according to the application of voltage, and comprise dispersion liquids and optical conversion particles dispersed in the dispersion liquids, the optical conversion particles include first particles and second particles, each of the second particles has a hollow formed
(Continued)

therein, and each surface of the first particles and each surface of the second particles are charged with the same polarity.

13 Claims, 19 Drawing Sheets

(51) Int. Cl.
    *G02F 1/1335*     (2006.01)
    *G02F 1/1675*     (2019.01)
    *G02F 1/1685*     (2019.01)
    *H10K 59/80*     (2023.01)

(52) U.S. Cl.
    CPC ...... *G02F 1/133524* (2013.01); *G02F 1/1685* (2019.01); *G02F 2001/1678* (2013.01); *H10K 59/877* (2023.02)

(58) Field of Classification Search
    CPC ......... G02F 1/133512; G02F 1/133524; G02F 2001/1678
    See application file for complete search history.

(56) References Cited

U.S. PATENT DOCUMENTS

| | | | |
|---|---|---|---|
| 10,739,663 | B2 | 8/2020 | Wang et al. |
| 2010/0134872 | A1 | 6/2010 | Johnson et al. |
| 2013/0222886 | A1* | 8/2013 | Kawahara ............... C08L 43/04 524/521 |
| 2016/0139479 | A1 | 5/2016 | Hirai et al. |
| 2016/0246155 | A1* | 8/2016 | Loxley .................... G02F 1/195 |
| 2019/0094576 | A1 | 3/2019 | Wang et al. |

FOREIGN PATENT DOCUMENTS

| | | | |
|---|---|---|---|
| EP | 1 662 305 | A2 | 5/2006 |
| JP | 2004-302456 | A | 10/2004 |
| KR | 10-2013-0002257 | A | 1/2013 |
| KR | 10-2013-0022966 | A | 3/2013 |
| KR | 10-2013-0032479 | A | 4/2013 |
| KR | 10-2013-0063972 | A | 6/2013 |
| KR | 10-2013-0078426 | A | 7/2013 |
| KR | 10-2013-0078440 | A | 7/2013 |
| KR | 10-2013-0108832 | A | 10/2013 |
| KR | 10-2014-0003775 | A | 1/2014 |
| KR | 10-2015-0125051 | A | 11/2015 |
| KR | 10-2015-0126515 | A | 11/2015 |
| KR | 10-2016-0026085 | A | 3/2016 |
| WO | 2014/208021 | A1 | 12/2014 |

OTHER PUBLICATIONS

Office Action dated May 27, 2024 in Korean Application No. 10-2019-0114929.

Office Action dated Jun. 12, 2024 in Korean Application No. 10-2019-0125374.

Office Action dated Mar. 19, 2025 in Chinese Application No. 202080065564.7.

* cited by examiner

LIGHT BLOCKING MODE

LIGHT ROUTE CONTROL MEMBER AND DISPLAY DEVICE COMPRISING SAME

CROSS-REFERENCE TO RELATED APPLICATIONS

This application is the U.S. national stage application of International Patent Application No. PCT/KR2020/011848, filed Sep. 3, 2020, which claims the benefit under 35 U.S.C. § 119 of Korean Application Nos. 10-2019-0114929, filed Sep. 18, 2019; and 10-2019-0125374, filed Oct. 10, 2019, the disclosures of each of which are incorporated herein by reference in their entirety.

TECHNICAL FIELD

An embodiment relates to a light route control member having improved front luminance and a display device including the same.

BACKGROUND ART

A light-shielding film shields transmitting of light from a light source, and is attached to a front surface of a display panel which is a display device used for a mobile phone, a notebook, a tablet PC, a vehicle navigation device, a vehicle touch, etc., so that the light-shielding film adjusts a viewing angle of light according to an incident angle of light to express a clear image quality at a viewing angle needed by a user when the display transmits a screen.

In addition, the light-shielding film may be used for the window of a vehicle, building or the like to shield outside light partially to inhibit glare, or to inhibit the inside from being visible from the outside.

That is, the light-shielding film may be a light route control member that controls a movement path of light, block light in a specific direction, and transmit light in a specific direction. Accordingly, by controlling the light transmission angle by the light-shielding film, it is possible to control the viewing angle of the user.

Meanwhile, such a light-shielding film may be a light-shielding film that can always control the viewing angle regardless of the surrounding environment or the user's environment, and switchable light-shielding film that allows the user to turn on/off the viewing angle control according to the surrounding environment or the user's environment may be distinguished.

Such a switchable light-shielding film may be implemented by adding electrically moving particles to the pattern portion and changing the receiving unit into a light transmitting portion and a light blocking portion by dispersion and aggregation of the particles.

That is, when the particles are aggregated in one direction, the receiving unit may act as a light transmitting part, and when the particles are dispersedly disposed, the receiving unit may act as a light blocking part. In this case, there is a problem in that the front luminance is lowered due to the particles aggregated in one region when the receiving unit is driven as the light transmitting part. In addition, if the amount of light of the backlight module is increased in order to improve the front luminance, there is a problem in that heat is increased.

Therefore, there is a need for a light route control member having an improved front luminance.

DISCLOSURE

Technical Problem

An embodiment is directed is to provide a light route control member having an improved front luminance by adding metal oxide particles for inducing light scattering together with light absorbing particles to a light conversion unit.

Technical Solution

A light route control member according to an embodiment comprising: a first substrate; a first electrode disposed on the first substrate; a second substrate disposed on the first substrate; a second electrode disposed under the second substrate; and a light conversion unit disposed between the first electrode and the second electrode, wherein the light conversion unit includes a partition wall unit and a receiving unit alternately disposed, wherein the receiving unit changes light transmittance according to application of a voltage, wherein the receiving unit includes a dispersion and light conversion particles dispersed in the dispersion, wherein the light conversion particle comprises a first particle and a second particle, wherein the reflectance of the second particle is greater than the reflectance of the first particle, wherein the second particle has a hollow formed therein, wherein the surface of the first particle and the surface of the second particle are charged with the same polarity.

Advantageous Effects

A light route control member according to an embodiment can have an improved front transmittance.

In addition, the light route control member according to an embodiment can have improved luminance uniformity.

In addition, the light route control member according to an embodiment can. have improved particle dispersion stability.

In detail, the transmittance of the light conversion unit can be improved when the light conversion unit is driven to the transmitting unit by the metal oxide particles that reflect and/or scatter light to the light conversion particles disposed in the light conversion unit.

That is, by disposing the light scattering particles in a region where the light absorbing particles are aggregated, the amount of light emitted in the user direction through the light scattering particles is increased, thereby improving the front transmittance.

In addition, it is possible to inhibit a portion in which the amount of light is reduced from being visually recognized by the light conversion unit region. That is, the overall luminance uniformity of the light route control member may be ensured, and thus the visibility of the user can be improved.

In addition, by controlling the difference in specific gravity between the light absorbing particles and the light scattering particles, it is possible to inhibit phase separation due to the difference in specific gravity, thereby inhibiting a specific particle from settling down. Accordingly, since dispersion stability is ensured, the transmittance characteristic of the light route control member can be maintained even after a long period of time.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, a light route control member according to an embodiment will be described with reference to drawings. The light route control member described below relates to a switchable light route control member that drives in various modes according to the movement of electrophoretic particles application of a voltage.

Figure 1:
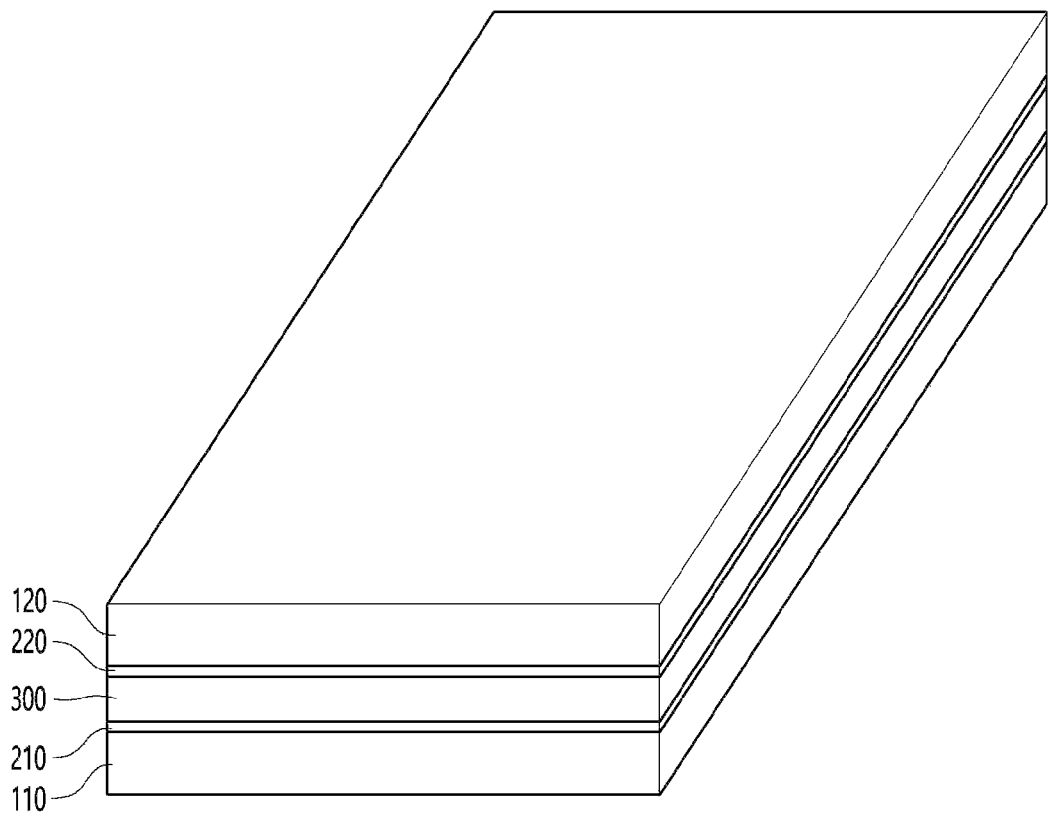
FIG. 1 is a perspective view of a light route control member according to an embodiment.
Figure 2:
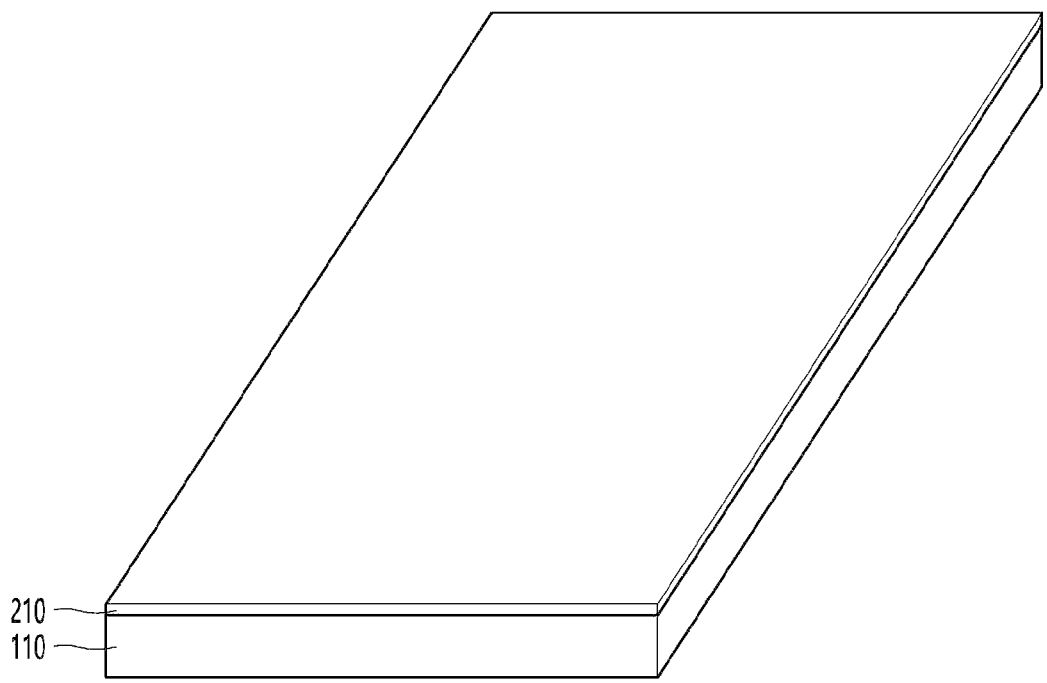
FIGS. 2 and 3 are views showing a perspective view of a first substrate and a first electrode and a perspective view of a second substrate and a second electrode of the light route control member according to the embodiment, respectively.
Figure 3:
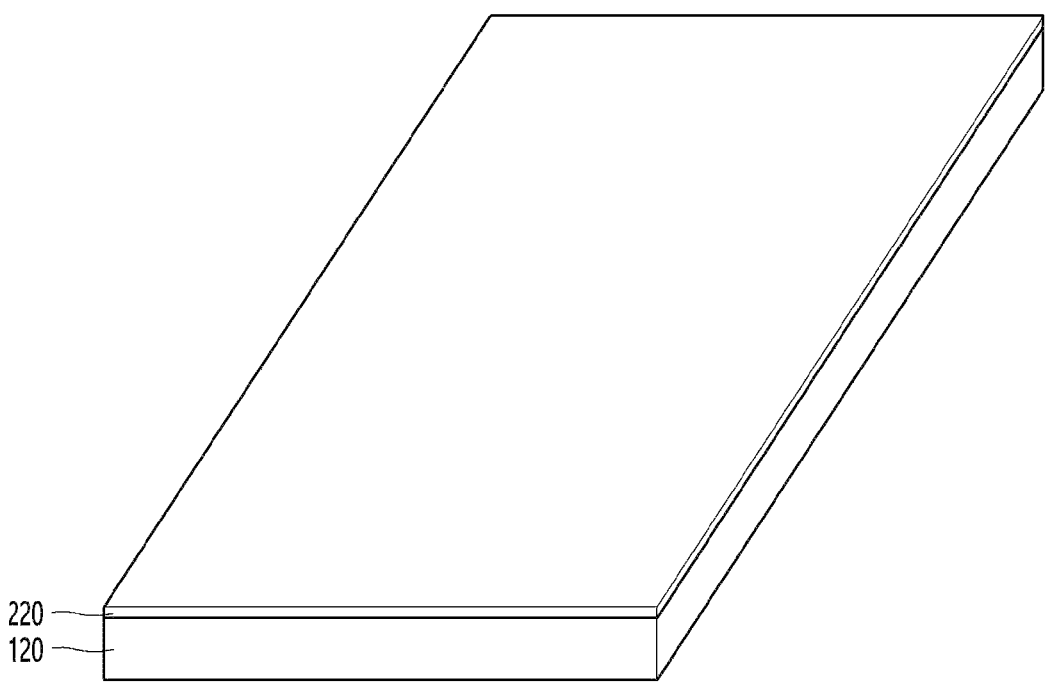

Referring to FIGS. 1 to 3, a light route control member according to an embodiment may include a first substrate 110, a second substrate 120, a first electrode 210, a second electrode 220, and a light conversion unit 300.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

Further, the first substrate 110 may be a curved or bended substrate. That is, the light route control member including the first substrate 110 may also be formed to have flexible, curved, or bent characteristics. Accordingly, the light route control member according to the embodiment may be changed to various designs.

The first substrate 110 may have a thickness of about 1 mm or less.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may contain a transparent conductive material. For example, the first electrode 210 may contain a metal oxide such as indium tin oxide, indium zinc oxide, copper oxide, tin oxide, zinc oxide, titanium oxide, etc.

The first electrode 210 may be disposed on the first substrate 110 in a film shape. In detail, light transmittance of the first electrode 210 may be about 80% or more.

The first electrode 210 may have a thickness of about 10 nm to about 50 nm.

Alternatively, the first electrode 210 may contain various metals to realize low resistance. For example, the first electrode 210 may contain at least one metal of chromium (Cr), nickel (Ni), copper (Cu), aluminum (Al), silver (Ag), molybdenum (Mo). gold (Au), titanium (Ti), and alloys thereof.

The first electrode 210 may be disposed on the entire surface of one surface of the first substrate 110. In detail, the first electrode 210 may be disposed as a surface electrode on one surface of the first substrate 110, However, the embodiment is not limited thereto, and the first electrode 210 may be formed of a plurality of pattern electrodes having a predetermined pattern.

For example, the first electrode 210 may include a plurality of conductive patterns. In detail, the first electrode 210 may include a plurality of mesh lines intersecting each other and a plurality of mesh openings formed by the mesh lines.

Accordingly, even though the first electrode 210 contains a metal, visibility may be improved because the first electrode is not visible from the outside. In addition, the light transmittance is increased by the openings, so that the brightness of the light route control member according to the embodiment may be improved.

The second substrate 120 may be disposed on the first substrate 110. In detail, the second substrate 120 may be disposed on the first electrode 210 on the first substrate 110.

The second substrate 120 may contain a material capable of transmitting light. The second substrate 120 may contain a transparent material. The second substrate 120 may contain a material the same as or similar to that of the first substrate 110 described above.

For example, the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the second substrate 120 may be a flexible substrate having flexible characteristics.

Further, the second substrate 120 may be a curved or bended substrate. That is, the light route control member including the second substrate 120 may also be formed to have flexible, curved, or bent characteristics. Accordingly, the light route control member according to the embodiment may be changed to various designs.

The second substrate 120 may have a thickness of about 1 mm or less.

The second electrode 220 may be disposed on one surface of the second substrate 120. In detail, the second electrode 220 may be disposed on a lower surface of the second substrate 120. That is, the second electrode 220 may be disposed on a surface on which the second substrate 120 faces the first substrate 110. That is, the second electrode 220 may be disposed facing the first electrode 210 on the first substrate 110. That is, the second electrode 220 may be disposed between the first electrode 210 and the second substrate 120.

The second electrode 220 may contain a transparent conductive material. For example, the second electrode 220 may contain a metal oxide such as indium tin oxide, indium zinc oxide, copper oxide, tin oxide, zinc oxide, titanium oxide, etc.

The second electrode 220 may be disposed on the first substrate 110 in a film shape. In addition, the light transmittance of the second electrode 220 may be about 80% or more.

The second electrode 220 may have a thickness of about 10 nm to about 50 nm.

Alternatively, the second electrode 220 may contain various metals to realize low resistance. For example, the second electrode 220 may contain at least one metal of chromium (Cr), nickel (Ni), copper (Cu), aluminum (Al), silver (Ag), molybdenum (Mo), gold (Au), titanium (Ti), and alloys thereof.

The first electrode 210 may be disposed on the entire surface of one surface of the first substrate 110. In detail, the first electrode 210 may be disposed as a surface electrode on one surface of the first substrate 110, However, the embodiment is not limited thereto, and the first electrode 210 may be formed of a plurality of pattern electrodes having a predetermined pattern.

For example, the second electrode 220 may include a plurality of conductive patterns. In detail, the second electrode 220 may include a plurality of mesh lines intersecting each other and a plurality of mesh openings formed by the mesh lines.

Accordingly, even though the second electrode 220 contains a metal, visibility may be improved because the second electrode 220 is not visible from the outside. In addition, the light transmittance is increased by the openings, so that the brightness of the light route control member according to the embodiment may be improved.

The light conversion unit 300 may be disposed between the first substrate 110 and the second substrate 120. In detail, the light conversion unit 300 may be disposed between the first electrode 210 and the second electrode 220.

an adhesive layer 400 may be disposed between at least one of the light conversion unit 300 and the first substrate 110 or between the light conversion unit 300 and the second substrate 120. The first substrate 110, the second substrate 120, and the light conversion unit 300 may be adhered to each other by the adhesive layer 400.

Also, although not shown in the drawings, a buffer layer may be disposed between the first electrode 210 and the light conversion unit 300. The adhesion between the first electrode 210 and the light conversion unit 300 including different materials may be improved by the buffer layer.

Figure 4:
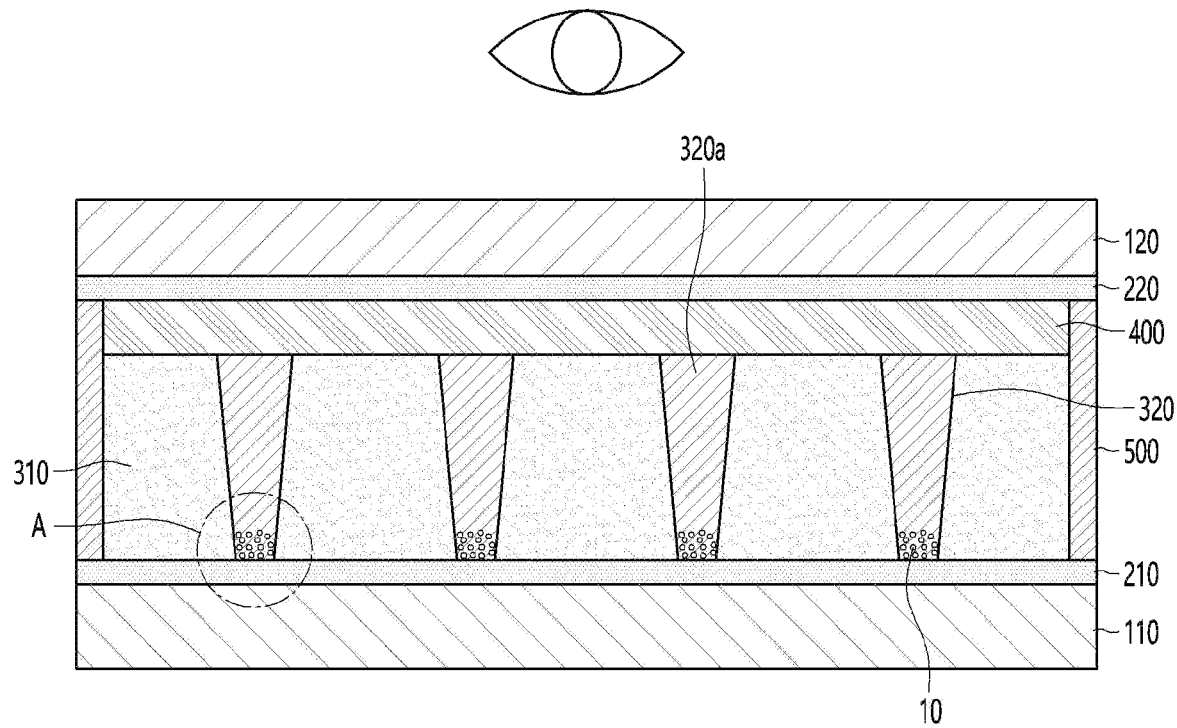
FIGS. 4 and 5 are views showing various cross-sectional views of the light route control member according to the embodiment.
Figure 5:
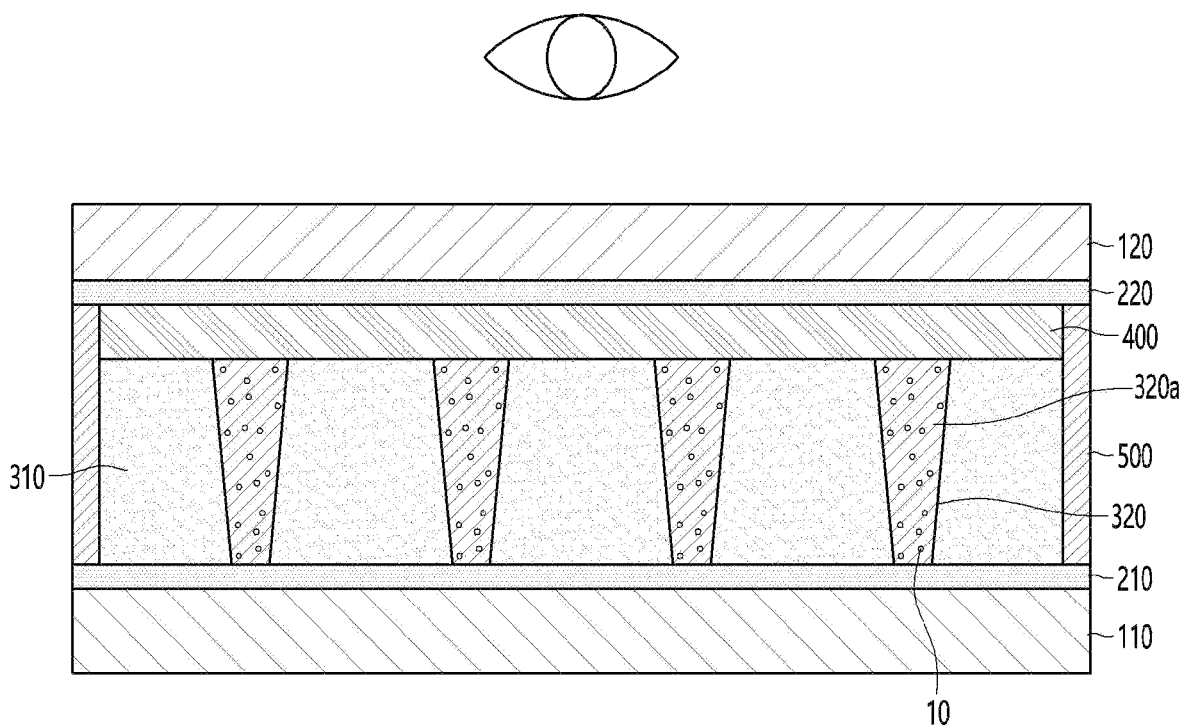

Referring to FIGS. 4 and 5, the light conversion unit 300 may include a partition wall unit 310 and a receiving unit 320.

The partition wall unit 310 may be defined as a partition wall region for partitioning a region of receiving unit 320. That is, the partition wall part 310 is a partition wall area dividing a plurality of a receiving unit. And the receiving unit 320 may be defined as a variable region that is variable to a light blocking unit and a light transmitting unit according to application of voltage.

The partition wall unit 310 and the receiving unit 320 may be alternately disposed. The partition wall unit 310 and the receiving unit 320 may be disposed in different widths. For example, the width of the receiving unit 320 may be greater than the width of the receiving unit 320.

The partition wall unit 310 and the receiving unit 320 may be disposed in direct or indirect contact with at least one of the first electrode 210 and the second electrode 220.

The partition wall unit 310 and the receiving unit 320 may be alternately disposed. In detail, the partition wall unit 310 and the receiving unit 320 may be alternately disposed. That is, each of the partition wall units 310 may be disposed between the receiving units 320 adjacent to each other, and each of the receiving units 320 may be disposed between the partition wall units 310 adjacent to each other.

The partition wall unit 310 may contain a transparent material. The partition wall unit 310 may contain a material that may transmit light.

The partition wall unit 310 may contain a resin material. For example, the partition wall unit 310 may contain a photo-curable resin material. As an example, the partition wall unit 310 may contain a UV resin or a transparent photoresist resin. Alternatively, the partition wall unit 310 may contain urethane resin or acrylic resin.

The partition wall unit 310 may transmit light incident on any one of the first substrate 110 and the second substrate 120 toward another substrate.

For example, in FIGS. 4 and 5, light may be emitted in a direction of the first substrate 110 and the light may be incident in the direction of the second substrate 120. The partition wall unit 310 may transmit the light, and the transmitted light may be moved in a direction of the second substrate 120.

A sealing part 500 sealing the light route control member may be disposed on a side surface of the partition wall unit. And a side surface of the light conversion unit 300 may be sealed by the sealing part.

The receiving units 320 may include the dispersion 320a and the light conversion particles 10 described above. In detail, the receiving unit 320 is filled with the dispersion 320a, and a plurality of the light conversion particles 10 may be dispersed in the dispersion 320a.

The dispersion 320a may be a material for dispersing the light conversion particles 10. The dispersion 320a may contain a transparent material. The dispersion 320a may contain a non-polar solvent. In addition, the dispersion 320a may contain a material capable of transmitting light. For example, the dispersion 320a may include at least one of a halocarbon-based oil, a paraffin-based oil, and isopropyl alcohol.

The light conversion particles 10 may be disposed to be dispersed in the dispersion 320a. In detail, the plurality of light conversion particles 10 may be disposed to be spaced apart from each other in the dispersion 320a.

The light transmittance of the receiving unit 320 may be changed by the light conversion particles 10. In detail, the receiving unit 320 may be changed into the light blocking part and the light transmitting part by changing the light transmittance due to the movement of the light conversion particles 10. That is, the receiving unit 320 may change the transmittance of light passing through the receiving unit 320 by dispersion and aggregation of the light conversion particles 10 disposed in the dispersion 320a For example, the light route control member according to the embodiment may be changed from a first mode to a second mode or from the second mode to the first mode by a voltage applied to the first electrode 210 and the second electrode 220.

In detail, in the light route control member according to the embodiment, the receiving unit 320 becomes the light blocking part in the first mode, and light of a specific angle may be blocked by the receiving unit 320. That is, a viewing angle of the user viewing from the outside may be narrowed.

In addition, in the light route control member according to the embodiment, the receiving unit 320 becomes the light transmitting part in the second mode, and in the light route control member according to the embodiment, light may be transmitted through both the partition wall unit 310 and the receiving unit 320. That is, the viewing angle of the user viewing from the outside may be widened.

Switching from the first mode to the second mode, that is, the conversion of the receiving unit 320 from the light blocking part to the light transmitting part may be realized by movement of the light conversion particles 10 of the receiving unit 320. Thai is, the light conversion particle 10 has a charge on the surface, and may be moved in the direction of the first electrode or the second electrode by the application of a voltage according to the characteristics of the charge. That is, the light conversion particle 10 may be an electrophoretic particle.

In detail, the receiving unit 320 may be electrically connected to the first electrode 210 and the second electrode 220.

In this case, when a voltage is not applied to the light route control member from the outside, the light conversion particles 10 of the receiving unit 320 are uniformly dispersed in the dispersion 320a, and light may be blocked by the light conversion particles in the receiving unit 320. Accordingly, in the first mode, the receiving unit 320 may be driven as the light blocking part.

Alternatively, when a voltage is applied to the light route control member from the outside, the light conversion particles 10 may move. For example, the light conversion particles 10 may move toward one end or the other end of the receiving unit 320 by a voltage transmitted through the first electrode 210 and the second electrode 220. That is, the light conversion particles 10 may move from the receiving unit 320 toward the first electrode or the second electrode.

In detail, when a voltage is applied to the first electrode 210 and/or the second electrode 220, an electric field is formed between the first electrode 210 and the second electrode 220, and the charged carbon black, that is, the light absorbing particles may be moved toward a positive electrode of the first electrode 210 and the second electrode 220 using the dispersion 320a as a medium.

That is, when the voltage is applied to the first electrode 210 and/or the second electrode 220, as shown in FIG. 4, the light conversion particles 10 may be moved toward the first electrode 210 in the dispersion 320a. That is, the light conversion particles 10 are moved in one direction, and the receiving unit 320 may be driven as the light transmitting part In addition, when the voltage is not applied to the first electrode 210 and/or the second electrode 220, as shown in FIG. 5, the light conversion particles 10 may be uniformly dispersed in the dispersion 320a to drive the receiving unit 320 as the light blocking part.

Accordingly, the light route control member according to the embodiment may be driven in two modes according to a user's surrounding environment. That is, when the user requires light transmission only at a specific viewing angle, the receiving unit is driven as the light blocking part, or in an environment in which the user requires high brightness, a voltage may be applied to drive the receiving unit as the light transmitting part.

Therefore, since the light route control member according to the embodiment may be implemented in two modes according to the user's requirement, the light route control member may be applied regardless of the user's environment.

Meanwhile, in the second mode in which the receiving unit 320 is driven as a light transmitting part, the light conversion particles 10 of the receiving unit 320 move in the electrode direction, and the emitted light may pass through the accommodating part.

In this case, the light is blocked in the region where the light conversion particles 10 are aggregated among the receiving unit 320 region. Accordingly, the luminance of the light route control member may be reduced. In addition, the luminance of light in a specific region of the light route control member may be reduced, and thus the uniformity of luminance of the region of the light route control member may be reduced. Accordingly, a stain may be recognized when the user looks at it, thereby reducing visibility.

Accordingly, the light route control member according to the embodiment may further include scattering particles disposed in the receiving unit 320.

Figure 6:
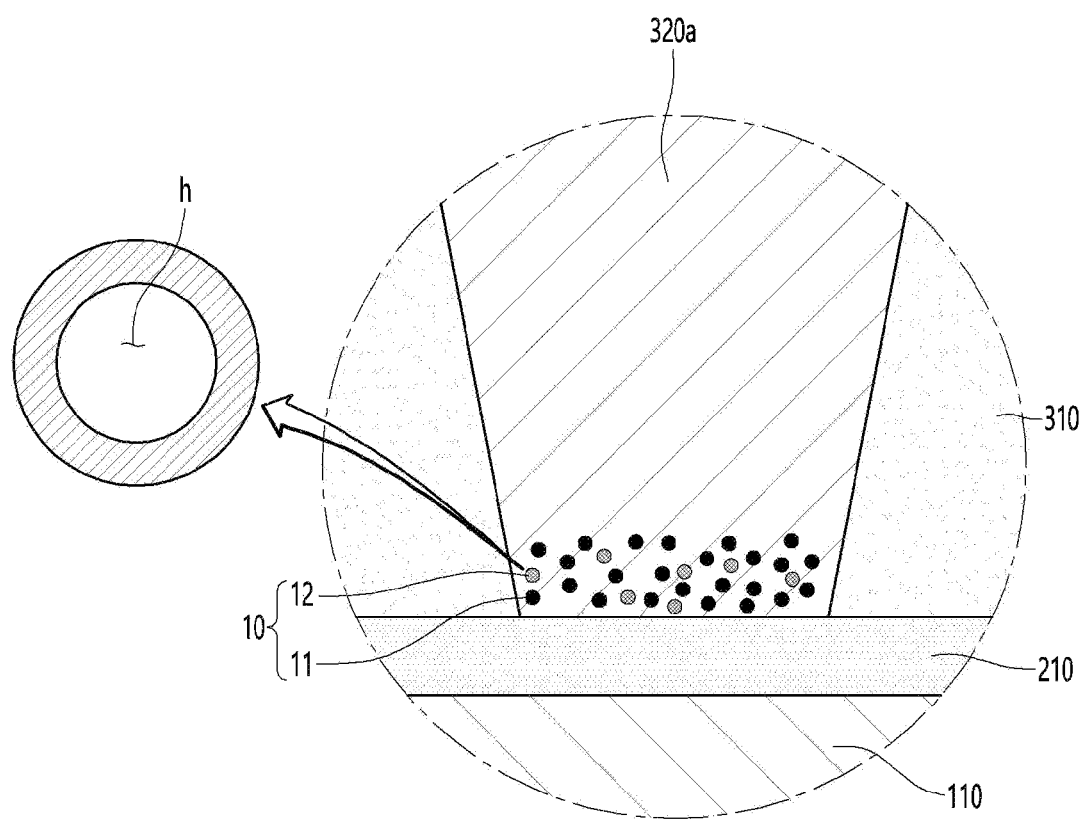
FIGS. 6 to 9 are an enlarged view of B region of FIG. 4

That is, referring to FIG. 6, the light conversion particle 10 may include a first particles 11 and a second particles 12.

The first particle 11 and the second particle 12 may be disposed together in the dispersion 320a. In detail, the first particles 11 and the second particles 12 may be separated from each other and dispersed in the dispersion 320a.

The first particles 11 and the second particles 12 may have different reflectivity. In detail, the reflectance of the first particles 11 may be smaller than the reflectance of the second particles 12. For example, the reflectance of the first particles 11 may be about 0.1% or less, and the reflectance of the second particles 12 may be about 50% to about 90%.

That is, the light incident to the first particles 11 is hardly reflected, the first particles 11 can absorb it, and the light incident on the second particle 12 may be reflected by about 50% to about 90%, and thus may be scattered.

In detail, the first particles 11 may absorb the light incident into the receiving unit 320. That is, the receiving unit 320 may be changed into a light transmitting part and a light blocking part by the first particles 11. That is, the first particles 11 may be light absorbing particles.

The first particles 11 may be formed in a spherical shape. In addition, the first particles 11 may be formed to have a particle diameter of a nano unit. In detail, the first particles 11 may be formed to have a particle diameter of 500 nm to 700 nm.

When the particle diameter of the first particles 11 is less than 500 nm, dispersion stability may be reduced due to aggregation of the first particles 11 inside the dispersion 320a.

In addition, when the particle diameter of the first particles 11 exceeds 700 nm, the weight of the first particle 11 increases. Thereby, the first particles 11 may be settled to the lower portion of the receiving unit.

The first particles 11 may have a color. In detail, the first particles 11 may include black particles. For example, the first particles 11 may include carbon black.

The second particle 12 may partially absorb and partially reflect light incident into the receiving unit 320. That is, the second particle 12 may have both reflection and absorption characteristics. That is, the second particles 12 may be light scattering particles.

The second particles 12 may be formed in a spherical shape. In addition, the second particles 12 may be formed to have a particle diameter of a nano unit. In detail, the second particles 12 may be formed to have a particle diameter of 500 nm to 700 nm. The first particles 11 and the second particles 12 may have the same or similar particle diameters within the particle diameter range.

When the particle diameter of the second particles 12 is less than 500 nm, dispersion stability may be reduced due to aggregation of the second particles 12 inside the dispersion 320a.

In addition, when the particle diameter of the second particles 12 exceeds 700 nm, the weight of the second particles 12 increases. Thereby, the second particles 12 may be settled to the lower portion of the receiving unit.

The second particles 12 may have a color. In detail, the second particles 12 may include black particles.

The second particles 12 may include a metal. In detail, the second particles 12 may include a metal oxide. For example, the second particles 12 may include at least one of titanium dioxide (TiO2), zirconium oxide (ZrO2), indium oxide (In2O3), tin oxide (SnO2), and aluminum oxide (Al2O3).

In addition, the second particles 12 may be formed in a hollow shape in which a hole h is formed. That is, the second particles 12 may have a hollow formed therein. That is, the second particles 12 may be formed in a spherical shape in which a hole of a certain size is formed therein, unlike the first particle 11.

As the second particles 12 includes the hole h, the specific gravity of the second particles 12 may be controlled. In detail, as the second particles 12 includes the hole h, the specific gravity of the second particles 12 may be reduced.

For example, when the second particles 12 includes titanium dioxide, the specific gravity of the second particles 12 not including a hole may be 3.5 to 4.0, and the specific gravity of the second particles 12 including a hole may be 2.5 to 2.8.

Alternatively, when the second particles 12 includes aluminum oxide, the specific gravity of the second particle 12 not including a hole may be 3.7 to 4.2, and the specific gravity of the second particle 12 including a hole may be 2.5 to 3.1.

Meanwhile, the specific gravity of the first particles 11 including carbon black may be about 1.8 to 2.0.

That is, as the second particles 12 includes the hole, the difference in specific gravity between the first particles 11 and the second particles 12 may be reduced. Accordingly, it is possible to inhibit phase separation of the first particles 11 and the second particles 12 due to a difference in specific gravity between the first particles 11 and the second particles 12.

That is, as the second particles 12 include a hollow, the specific gravity of the second particles 12 is reduced, and accordingly, the difference in specific gravity between the first particles 11 and the second particles 12 can be reduced.

In detail, the specific gravity of the second particles 12 is 1.2 times to 1.6 times the specific gravity of the first particles 11, and accordingly, the first particles 11 and the second particles 12 can minimize phase separation.

That is, the second particles 12 having a large specific gravity is located in the lower part of the receiving unit 320, and the first particles 11 having a small specific gravity are located in the upper part of the receiving unit 320. Accordingly, it is possible to inhibit the first particles 11 and the second particles 12 from being phase separated from each other.

Accordingly, the first particles 11 and the second particles 12 disposed inside the receiving unit 320 may be uniformly dispersed without phase separation from each other, thereby improving the dispersibility of the light conversion particles.

The first particles 11 and the second particles 12 may be charged with the same polarity. That is, the surfaces of the first particles 11 and the second particles 12 may be charged with (+) or (−) polarity. Accordingly, when a voltage is applied to the first electrode and/or the second electrode, the first particles 11 and the second particles 12 may move in the same direction as each other.

Figure 7:
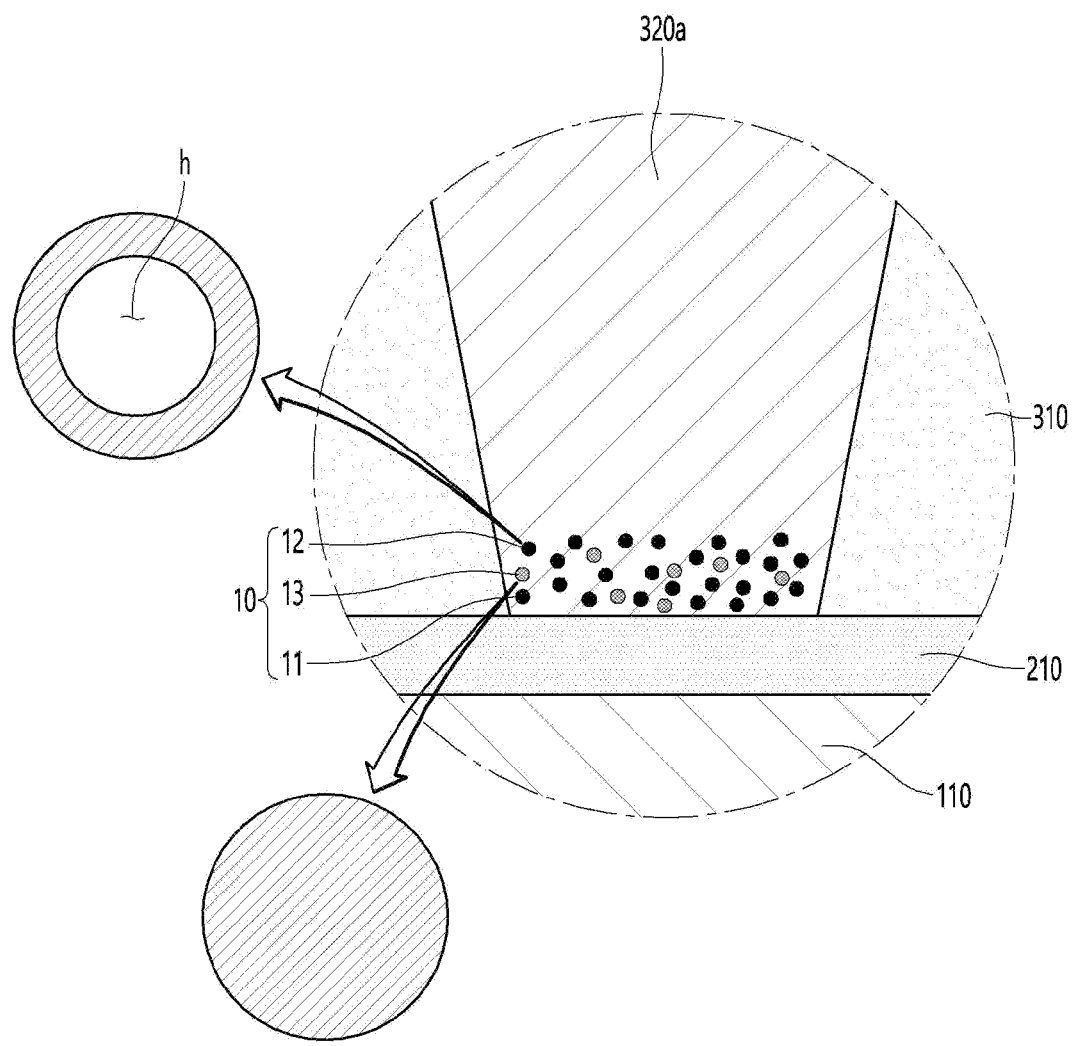

Meanwhile, referring to FIG. 7, the light conversion particle 10 may include a first particles 11, a second particle 12, and a third particles 13.

Since the first particles 11 and the second particles 12 are the same as the first particles 11 and the second particles 12 described in the description of FIG. 6 above, the following description will be omitted.

The third particles 13 may have similar characteristics to the second particles 12 except for specific gravity.

The third particles 13 may partially absorb and partially reflect light incident into the receiving unit 320. That is, the third particles 13 may have both reflection and absorption characteristics. That is, the third particles 13 may be light scattering particles.

The third particles 13 may be formed in a spherical shape. In addition, the third particles 13 may be formed with a particle diameter of a nano unit. In detail, the third particles 13 may be formed to have a particle diameter of 500 nm to 700 nm. The third particles 13 may have the same or similar particle diameter as the first particles 11 and the second particles 12 within the particle range.

When the particle diameter of the third particles 13 is less than 500 nm, dispersibility may be reduced due to aggregation of the third particles 13 inside the dispersion 320a.

The third particles 13 may have a color. In detail, the third particles 13 may include black particles.

The third particles 13 may include the same and similar material as the second particles 12.

In detail, the third particles 13 may include a metal oxide. For example, the third particles 13 may include at least one of titanium dioxide (TiO2), zirconium oxide (ZrO2), indium oxide (In2O3), tin oxide (SnO2), and aluminum oxide ($Al_2O_3$).

The second particles 12 and the third particles 13 may include the same metal oxide or different metal oxides.

The second particles 12 and the third particles 13 may have different specific gravity. That is, the second particles 12 may be a particle having a hollow therein, and the third particles 13 may be a bulk particle having no hole formed therein.

That is, the specific gravity of the third particles 13 may be greater than the specific gravity of the first particles 11 and the second particles 12.

The second particles 12 and the third particles 13 may have different reflectivity. In detail, the reflectance of the third particles 13 may be greater than the reflectance of the second particles 12.

That is, by including the second particles 12 including the metal oxide together with the first particles 11, it is possible to reduce the phase separation of particles due to the difference in specific gravity. In addition, by including the third particle 13 having a high reflectance, it is possible to induce light scattering to improve the front transmittance.

Figure 8:
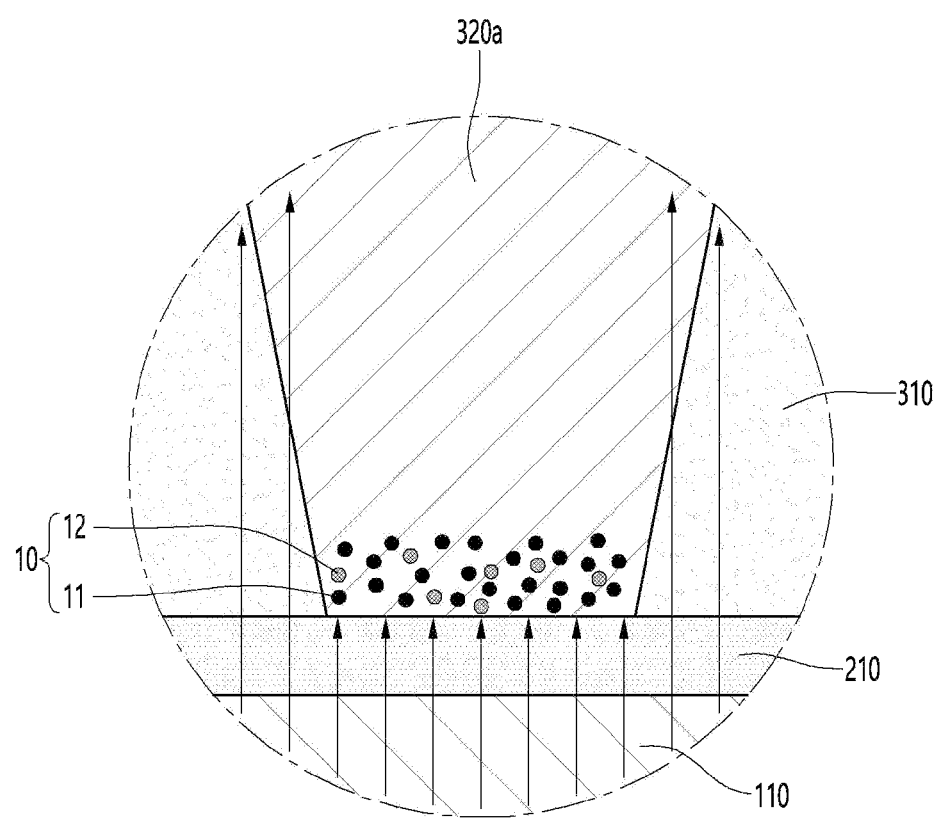
Figure 9:
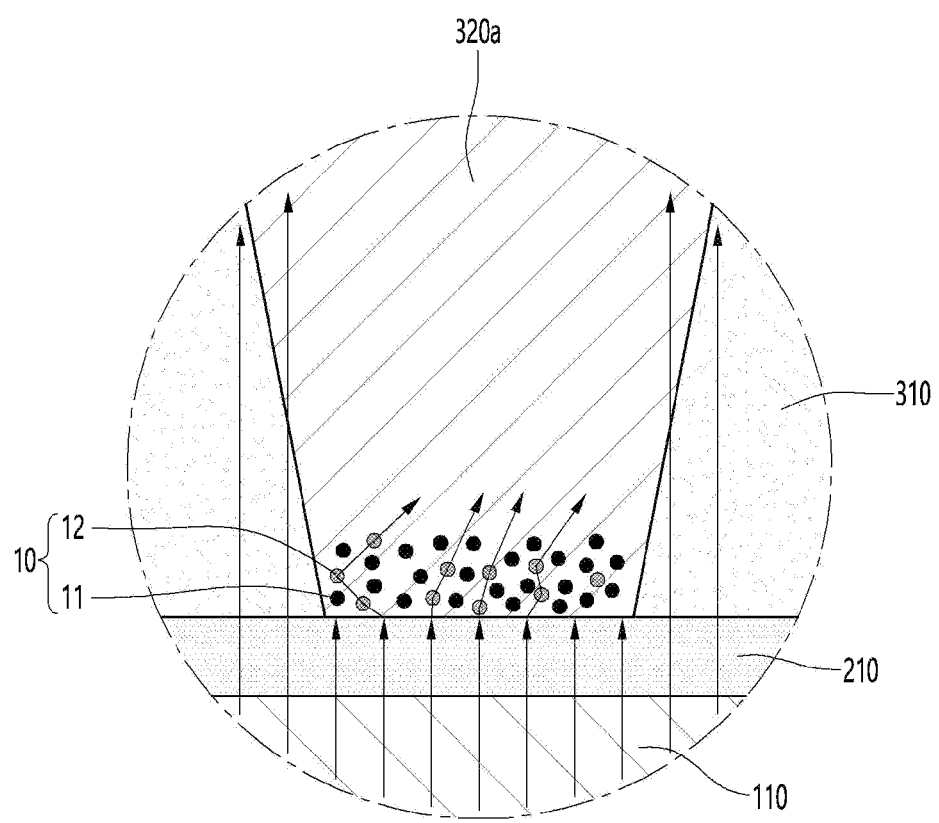

FIG. 8 is a view for explaining an example in which only the first particles 11 is disposed inside the receiving unit 320, FIG. 9 is a view for explaining an example in which the first particles 11 and the second particles 12 are disposed together inside the receiving unit 320.

Referring to FIGS. 8 and 9, the second particles 12 may improve the front luminance of the light route control member.

In detail, referring to FIG. 8, when only the first particles 11, ie, light absorbing particles, are disposed inside the receiving unit 320, by the aggregated first particles the light incident in the direction of the receiving unit is mostly can be blocked. That is, since the light incident in the direction of the receiving unit 320 is blocked and not emitted in the direction of the user, the front luminance of the light route control member may be reduced. In addition, since the light incident in the direction of the receiving unit 320 is blocked so that the luminance in a specific region becomes smaller than the luminance in other regions, the luminance uniformity of the light route control member may be reduced.

However, referring to FIG. 9, when the first particles 11 and the second particles 12 and/or the third particles 13 are disposed together in the receiving unit 320, the second particles 12 and/or the third particles 13 can increase the amount of light emitted toward the user.

In detail, referring to FIG. 9, light incident to the second particles 12 by the second particles 12 and/or the third particles 13 that are aggregated together with the first particles 11 may be scattered and refracted. Accordingly, it is possible to increase the amount of light emitted in the direction of the user passing through the receiving unit 320 by reflection and refraction of light through the second particles 12 and/or the third particles 13.

Accordingly, the front luminance of the light route control member can be improved, and the luminance uniformity of the light route control member can be improved.

Meanwhile, when the light conversion particle includes the first particles and the second particles, the first particles 11 and the second particles 12 may be included in different weight %. In detail, the first particles 11 in each receiving unit may be included in more than the second particles 12.

In detail, the first particles 11 inside each receiving unit may be included in an amount of 95 wt % to 99 wt % with respect to the total particle. In addition, the second particles 12 may be included in an amount of 1 wt % to 5 wt % with respect to the total particles.

When the second particles 12 is included in an amount of less than 1 wt % with respect to the total particles, the light scattering effect according to the second particle is small, so that it is difficult to improve the front transmittance. In addition, when the second particles 12 is included in more than 5% by weight with respect to the total particles, the amount of the first particle is reduced, so that the light absorption rate in the receiving unit may be lowered, and the change in the front transmittance may be reduced.

In addition, when the light conversion particle includes a first particles, a second particles, and a third particles, the first particles 11, the second particles 12, and the third particles 13 have different weights % may be included. In detail, the first particles 11 may be included in more than the second particles 12 and the third particles 13 in each receiving unit.

In detail, the first particles 11 inside each receiving unit may be included in an amount of 95 wt % to 99 wt % with respect to the total particle. Also, the sum of the second particles 12 and the third particles 13 may be included in an amount of 1 wt % to 5 wt % with respect to the total particles.

When the sum of the second particles 12 and the third particles 13 is less than 1% by weight with respect to the total particles, the light scattering effect according to the second particles is small, so that the front transmittance may be reduced. In addition, when the sum of the second particles 12 and the third particles 13 is more than 5% by weight with respect to the total particles, the amount of the first particles is reduced, so that the light absorption rate in the receiving unit 320 may be reduced. and the change in front transmittance may be reduced.

Hereinafter, the present invention will be described in more detail through the transmittance of the light route control member according to Examples and Comparative Examples. These embodiments are merely presented as examples in order to explain the present invention in more detail. Therefore, the present invention is not limited to these examples.

Example 1

First and second electrodes including indium tin oxide (ITO) were respectively disposed on one surface of the first and second substrates including polyethylene terephthalate (PET).

Then, a UV resin was disposed on the first substrate and imprinted through a mold to form a receiving unit.

Then, the light conversion part was formed by filling the receiving unit with paraffinic oil in which carbon black particles and titanium dioxide particles having hollows were dispersed therein.

At this time, the titanium dioxide particles were included in 5% by weight based on the total particles.

Next, after the first substrate, the second substrate, and the light conversion unit were adhered to prepare a light route control member, when a voltage was applied, the front transmittance of the light route control member was measured.

Example 2

After the light route control member was manufactured in the same manner as in Example 1, except that paraffinic oil in which carbon black particles and aluminum oxide particles having hollows formed therein were dispersed were filled in the receiving unit, when a voltage was applied, the front transmittance of the light route control member was measured.

At this time, the aluminum oxide particles were included in an amount of 5% by weight based on the total particles.

Example 3

After the light route control member was manufactured in the same manner as in Example 1, except that paraffinic oil in which carbon black particles, titanium dioxide particles, and titanium dioxide particles having hollows formed therein were dispersed were filled in the receiving unit, when a voltage was applied, the front transmittance of the light route control member was measured.

At this time, the titanium dioxide particles and the titanium dioxide particles having a hollow formed therein were included in an amount of 5% by weight based on the total particles.

Example 4

After the light route control member was manufactured in the same manner as in Example 1, except that paraffinic oil in which carbon black particles, aluminum oxide particles, and aluminum oxide particles having hollows formed therein were dispersed were filled in the receiving unit, when a voltage was applied, the front transmittance of the light route control member was measured.

At this time, the aluminum oxide particles and the aluminum oxide particles having a hollow formed therein were included in an amount of 5% by weight based on the total particles.

Comparative Example 1

After the light route control member was manufactured in the same manner as in Example 1, except that paraffinic oil in which carbon black particles only were dispersed were filled in the receiving unit, when a voltage was applied, the front transmittance of the light route control member was measured.

Comparative Example 2

After the light route control member was manufactured in the same manner as in Example 1, except that titanium dioxide particles were included in an amount of 7 wt % with respect to the total particles, when a voltage was applied, the front transmittance of the light path controlling member was measured.

Comparative Example 3

After the light route control member was manufactured in the same manner as in Example 2, except that aluminum oxide particles were included in an amount of 7 wt % with respect to the total particles, when a voltage was applied, the front transmittance of the light path controlling member was measured.

Comparative Example 4

After the light route control member was manufactured in the same manner as in Example 3, except that the titanium dioxide particles and the titanium dioxide particles having a hollow formed therein were included in an amount of 7% by weight based on the total particles, when a voltage was applied, the front transmittance of the light path controlling member was measured.

Comparative Example 5

After the light route control member was manufactured in the same manner as in Example 4, except that the aluminum oxide particles and the aluminum oxide particles having a hollow formed therein were included in an amount of 7% by weight based on the total particles, when a voltage was applied, the front transmittance of the light path controlling member was measured.

TABLE 1

|  | carbon black | titanium dioxide | titanium dioxide with hollow | aluminum oxide | aluminum dioxide with hollow |
|---|---|---|---|---|---|
| specific gravity | 2 | 3.8 | 2.5~2.8 | 4.0 | 2.5~3.1 |
| refractive index (%) | 0 | 2.6~2.9 | 2.1~2.4 | 1.8~1.9 | 1.7 |
| reflectivity (%) | 0 | 90 | 85 | 70 | 70 |

TABLE 2

| specific gravity | Example1 | Example2 | Example3 | Example4 | Comparative Example1 | Comparative Example2 | Comparative Example3 | Comparative Example4 | Comparative Example5 |
|---|---|---|---|---|---|---|---|---|---|
| transmittance (%) | 52 | 54 | 53 | 46 | 40 | 56 | 52 | 52 | 47 |

Table 1 shows specific gravity, refractive index, and reflectance of carbon black particles, titanium dioxide particles, titanium dioxide particles with hollows, aluminum oxide particles, and aluminum oxide particles with hollows.

Referring to Table 1, the specific gravity of the titanium dioxide particle and the aluminum oxide particle having hollows is smaller than the specific gravity of the titanium dioxide particle and the aluminum oxide particle in which the hollow is not formed. Accordingly, it can be seen that the difference in specific gravity with the carbon black particles is small.

That is, since the embodiment uses titanium dioxide particles and aluminum oxide particles having hollows, when mixed with carbon black particles, phase separation due to a specific gravity difference can be minimized.

Referring to Table 2, the front transmittance of the light route controlling member according to Examples 1 to 4 is greater than the front transmittance of the light route controlling member according to Comparative Examples.

That is, when a voltage is applied to the light route control member according to the first to fourth embodiments to drive the receiving unit to the light transmitting part, the amount of light moved in the front direction is increased by the metal oxide particles that reflect and scatter the light.

In addition, when the metal oxide particles exceed 5% by weight based on the total particles, the effect of improving the front transmittance may be small due to an increase in the side transmittance rather than the front transmittance.

Example 5

After the light route control member was manufactured in the same manner as in Example 1, except that paraffinic oil in which carbon black particles and titanium dioxide particles having hollows formed therein were dispersed were filled in the receiving unit, when a voltage was applied, the front transmittance of the light route control member was measured. In addition, when a voltage was applied after 1000 hours had elapsed, the front transmittance of the light route control member was measured.

Example 6

After the light route control member was manufactured in the same manner as in Example 2, except that paraffinic oil in which carbon black particles and aluminum oxide particles having hollows formed therein were dispersed were filled in the receiving unit, when a voltage was applied, the front transmittance of the light route control member was measured. In addition, when a voltage was applied after 1000 hours had elapsed, the front transmittance of the light route control member was measured.

Comparative Example 6

After the light route control member was manufactured in the same manner as in Example 1, when a voltage was applied, the front transmittance of the light route control member was measured. In addition, when a voltage was applied after 1000 hours had elapsed, the front transmittance of the light route control member was measured.

Comparative Example 7

After the light route control member was manufactured in the same manner as in Example 4, when a voltage was applied, the front transmittance of the light route control member was measured. In addition, when a voltage was applied after 1000 hours had elapsed, the front transmittance of the light route control member was measured.

TABLE 3

|  | Example5 | Example6 | Comparative Example6 | Comparative Example7 |
|---|---|---|---|---|
| Transmittance (0 hour) | 52 | 45 | 52 | 45 |
| Transmittance (after 1000 hour) | 52 | 44 | 50 | 42 |

Referring to Table 3, in the light route control members according to Examples 6 and 7, the front transmittance is maintained even after the lapse of time.

In the light route control member according to Comparative Examples 2 and 3, phase separation may occur due to the difference in specific gravity of the first and second particles over time, and thus the front transmittance may be reduced due to a decrease in properties of the second particles. However, the light route control members according to Examples 6 and 7 similarly control the specific gravity of particles 1 and 2 to have similar front transmittance even over time.

Meanwhile, the receiving unit 320 may be disposed to be spaced apart from the first electrode 210 or the second electrode 220.

Figure 10:
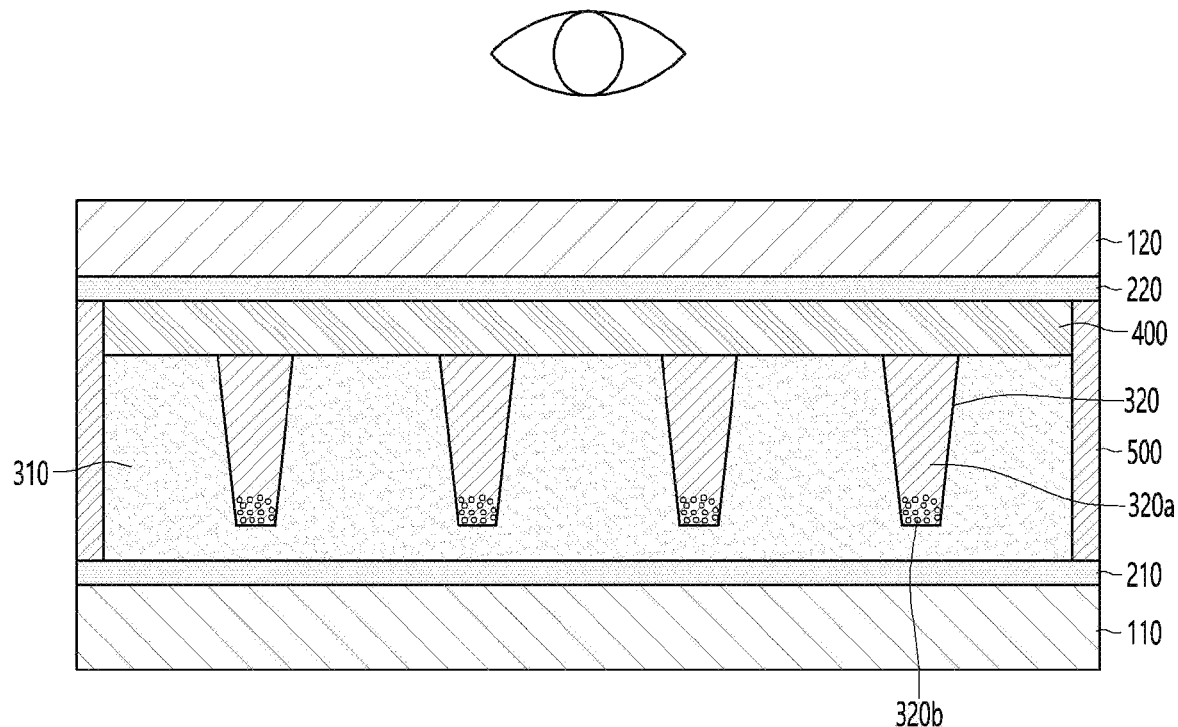
FIGS. 10 to 13 are views showing other cross-sectional views of the light route control member according to the embodiment.
Figure 11:
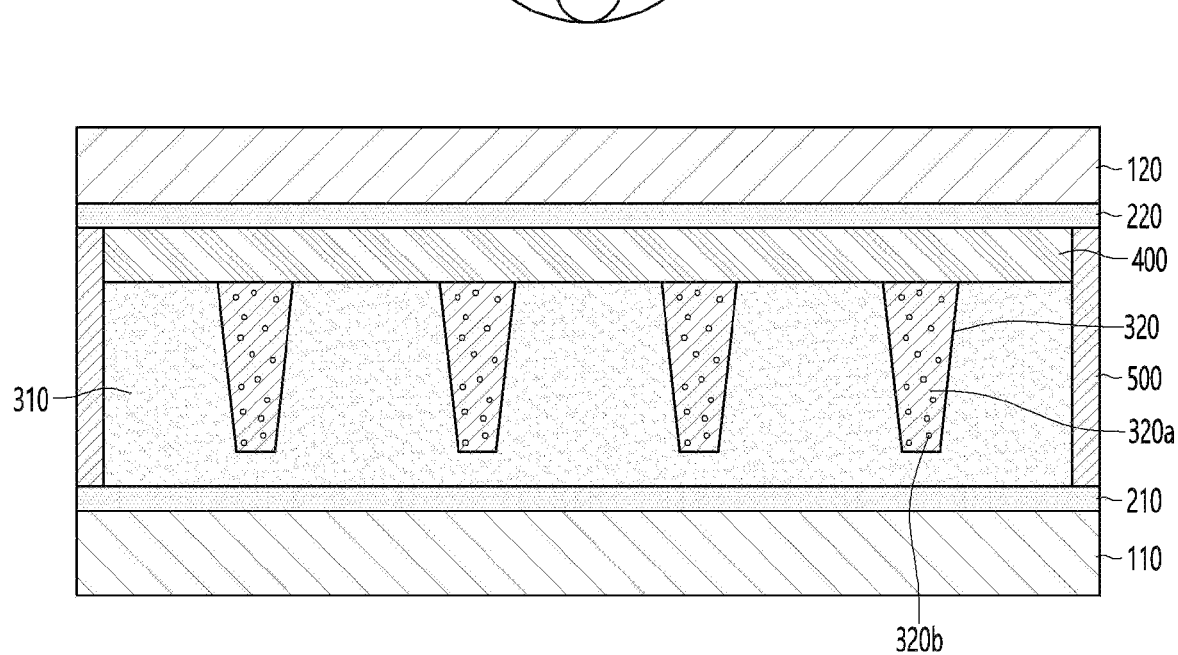

For example, referring to FIGS. 10 and 11, the receiving unit 320 may be spaced apart from the first electrode 210.

The same or similar material to the partition wall 310 may be disposed in a region where the receiving unit 320 and the first electrode 210 are spaced apart from each other.

Accordingly, by increasing the transmittance of the light emitted in the direction of the viewing plane, the luminance of the light route control member may be improved, thereby improving visibility.

Figure 12:
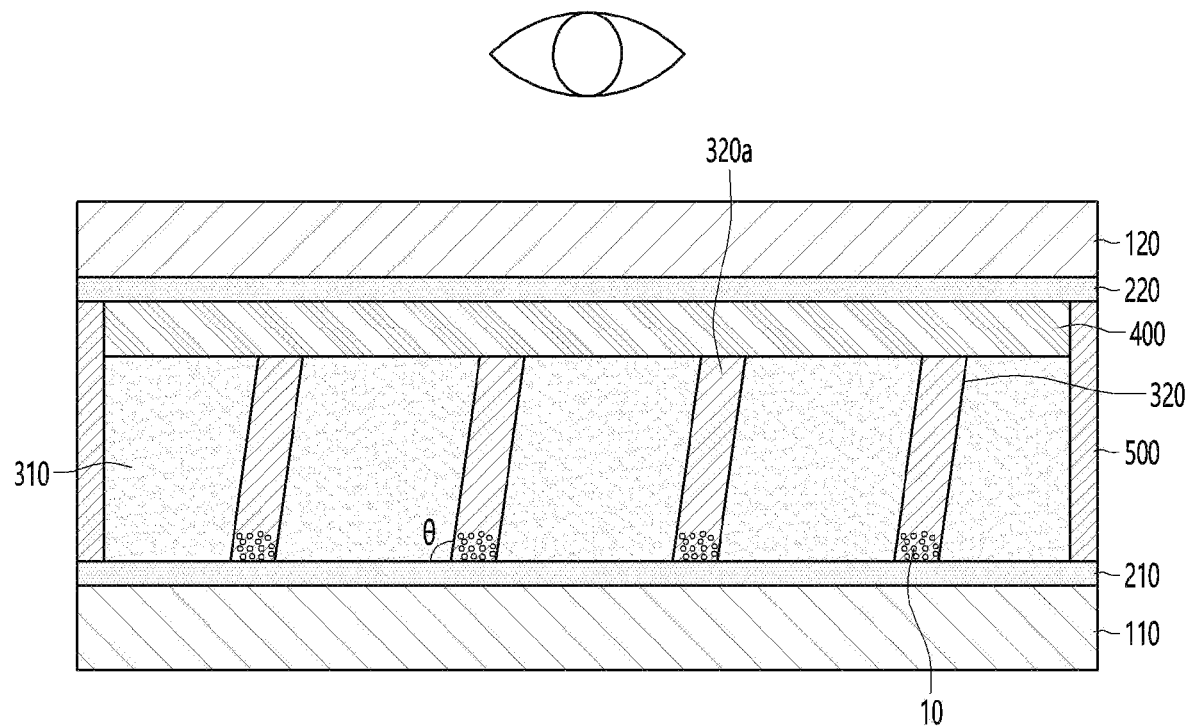
Figure 13:
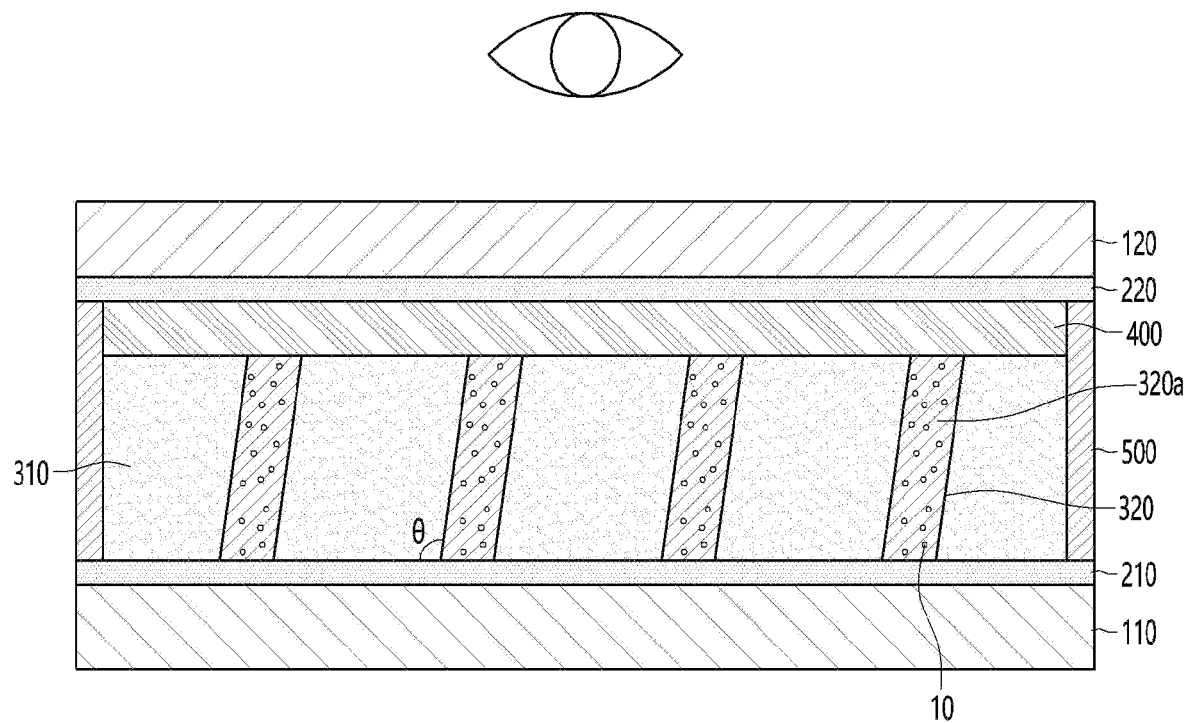

In addition, the receiving unit 320 may be disposed with an inclination angle θ. In detail, referring to FIGS. 12 and 13, the receiving part 320 may be disposed with an inclination angle θ of greater than 0° to less than 90° with respect to the first electrode 210 In detail, the receiving unit 320 may extend upwardly while having an inclination angle θ of greater than 0° to less than 90° with respect to one surface of the first electrode 210.

Accordingly, when the light route control member is used together with the display panel, moire caused by overlapping of the pattern of the display panel and the receiving portion 320 of the light path member may be inhibited, thereby improving user visibility.

Hereinafter, a light route control member according to another embodiment will be described with reference to FIGS. 14 to 19.

Figure 14:
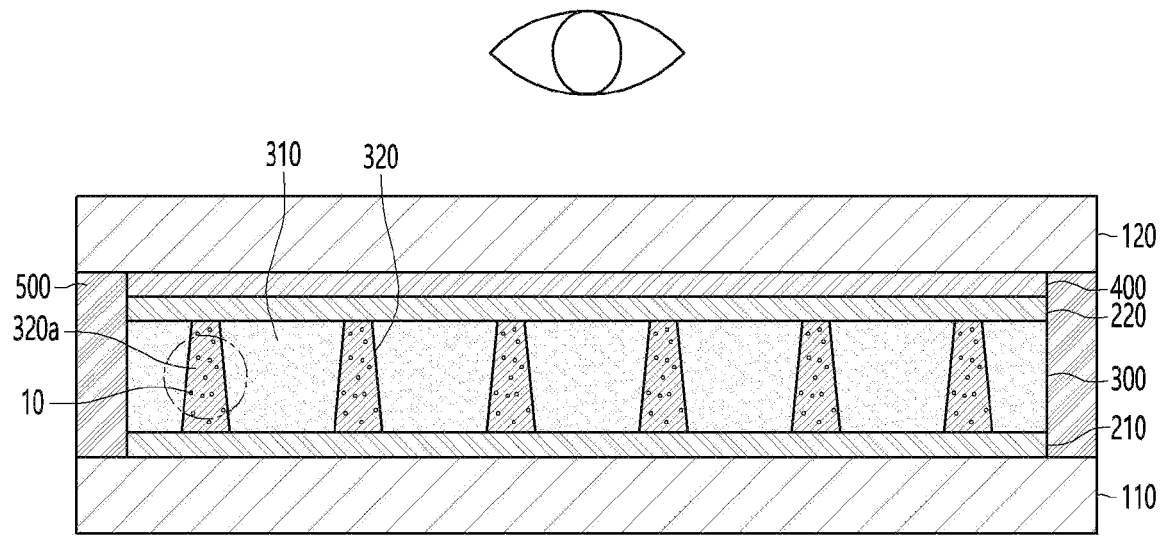
FIGS. 14 and 15 are views showing other cross-sectional views of the light route control member according to the embodiment.
Figure 15:
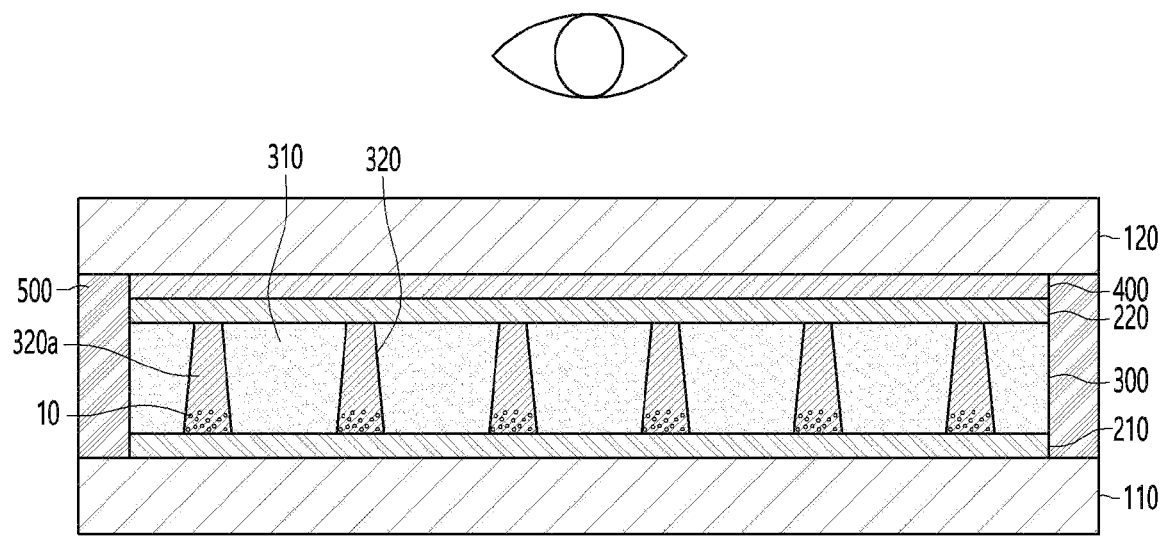

FIGS. 14 and 15 are views showing other cross-sectional views of the light route control member according to the embodiment.

Referring to FIGS. 14 and 15, a width of the receiving unit 320 may be narrowed while extending from the first substrate 110 to the second substrate 120 unlike the light route control member described above. That is, the width of the receiving unit 320 may be narrowed while extending from the light emitting part to the viewing part.

Meanwhile, when the light conversion particles 10 have improved dispersibility and movement speed in the dispersion 320a, driving characteristics of the light route control member and the display device including the same may be improved.

The driving speed of the light route member may be defined by Equation 1 below.

$$t_{switch} = \frac{h^2}{\mu V} \quad \text{[Formula 1]}$$

$h$: distance between electrodes (height of partition wall unit)

$\mu$: moving speed $V$: driving vortage

Referring to Equation 1, the driving speed of the light route control member increases as the moving speed of the light conversion particles increases.

There are various methods for improving the movement speed of the light conversion particles, but when the light conversion particles are aggregated in the dispersion, the movement speed of the light conversion particles is reduced, and the movement speed of each particle is also not uniform, Thereby, the driving characteristic of the light route control member may be reduced.

In order to improve the dispersibility of the light conversion particles in the dispersion, the specific gravity of the light conversion particles and the dispersion should be the same or a difference between them should be small. That is, when the difference in specific gravity between the light conversion particles and the dispersion is large, the light conversion particles are likely to settle into the lower portion of the dispersion. In addition, when the specific gravity of the dispersion is increased in order to reduce the difference in specific gravity between the light conversion particles and the dispersion, the driving speed may decrease.

Accordingly, the light route control member according to another embodiment reduces the specific gravity of the light conversion particles dispersed in the dispersion. In addition, by mixing a plurality of light conversion particles having different characteristics, the dispersibility of the light conversion particles may be improved, and the driving characteristics of the light path route member may be improved.

Figure 16:
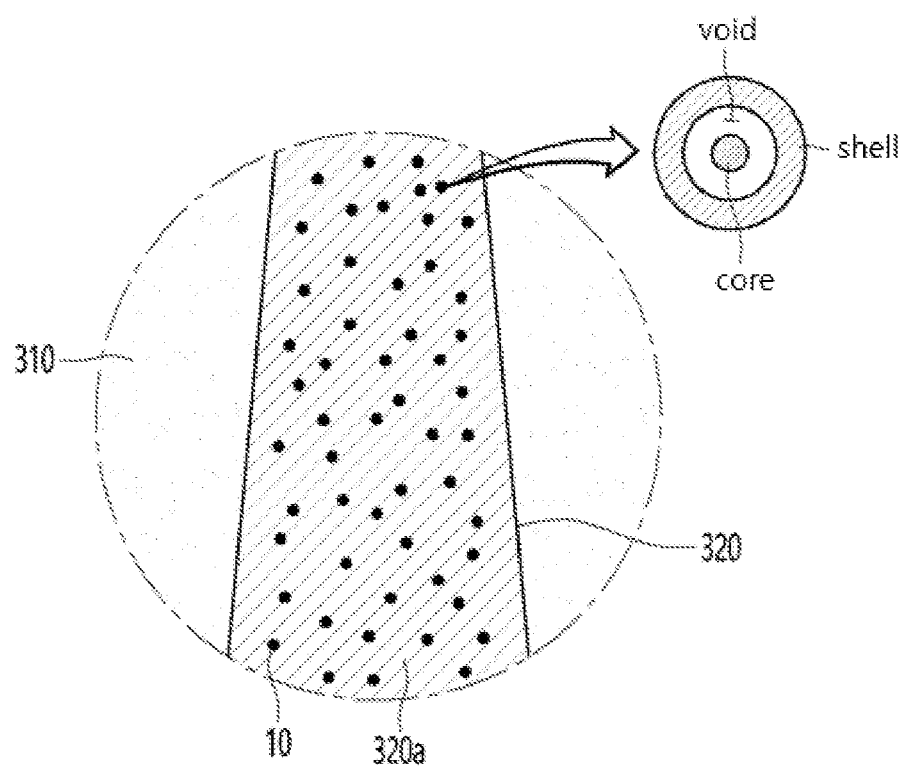
FIGS. 16 to 19 are an enlarged view of one region of FIG. 14

Referring to FIG. 16, the light conversion particles of the light route control member according to another embodiment may include at least one of carbon black and metal oxide. That is, the light route control member according to another embodiment may include light conversion particles of the same material.

For example, the light conversion particles 10 may include carbon black. In addition, the carbon black may be formed in a yoke-shell structure. That is, the carbon black may be formed in a yoke-shell structure having one core part and a plurality of shell structures. In detail, the light conversion particle may include a core, at least one void disposed on an outer surface of the core, and at least one shell portion. In detail, the light conversion particle may be formed in a core-void-shell, that is, a yoke-shell structure having a plurality of voids and a plurality of shell structures between the core and the shell.

The specific gravity of the carbon black may be about 1.8 to 7.9, and the specific gravity of the dispersion may be about 0.7 to 1.5. Accordingly, when the carbon black is used alone as the light conversion particle, the carbon black may be precipitated due to a difference in specific gravity between the carbon black and the dispersion. Thereby, dispersibility may be reduced due to agglomeration of carbon black.

Accordingly, by forming the carbon black in a yoke-shell structure, the specific gravity of the carbon black may be reduced, and dispersibility of the light conversion particles may be improved.

The specific gravity of the carbon black having the yoke-shell structure may be about 0.6 to 1.5. In detail, the specific gravity of the carbon black may be changed according to the number of shells. In detail, when the carbon black has one shell layer, the specific gravity of the carbon black may be 1.2 to 1.5. In addition, when the carbon black has two shell layers, the specific gravity of the carbon black may be 1.0 to 1.3. In addition, when the carbon black has three shell layers, the specific gravity of the carbon black may be 0.8 to 1.0. In addition, when the carbon black has four or more shell layers, the specific gravity of the carbon black may be 0.6 to 0.9. That is, the specific gravity of the carbon black may be reduced in proportion to the number of shell layers.

That is, the light conversion particles according to the first embodiment may include carbon black, and the carbon black may be formed in a yoke-shell structure to reduce specific gravity. Accordingly, by making the specific gravity of the light conversion particles and the dispersion similar to each other, dispersibility of the light conversion particles may be improved, and driving characteristics of the light route control member may be improved.

In addition, the specific surface area of the carbon black may be changed according to the number of shells of the carbon black. The specific surface area of the carbon black may be 300 m$^2$/g to 5000 m$^2$/g.

In detail, when the carbon black has one shell layer, the specific surface area of the carbon black may be 300 m 2/g to 1500 m$^2$/g. In addition, when the carbon black has two shell layers, the specific surface area of the carbon black may be 800 m$^2$/g to 2200 m$^2$/g. In addition, when the carbon black has three shell layers, the specific surface area of the carbon black may be 1500 m$^2$/g to 3500 m$^2$/g. In addition, when the carbon black has four or more shell layers, the specific surface area of the carbon black may be 2000 m$^2$/g to 5000 m$^2$/g. That is, the specific surface area of the carbon black may be increased in proportion to the number of shell layers.

Accordingly, as the specific surface area of the carbon black, ie, the specific surface area of the shell layer, increases, the movement speed of the light conversion particles in the dispersion may be increased. That is, the coating area of the surface charge layer imparting a surface charge to the light conversion particles increases due to an increase in the specific surface area of the light conversion particles. Accordingly, it is possible to increase the movement speed of the light conversion particles in the dispersion.

That is, as shown in Equation 2 below, by increasing the moving speed of the light conversion particles proportional to the amount of surface charge, the driving speed of the light route control member can be improved.

$$\mu = \frac{2\varepsilon\varepsilon_0 \zeta}{3\eta} \quad \text{[Formula 2]}$$

$\varepsilon$: permittivity $\zeta$: surface charge $\eta$: viscosity

Also, as another example, the light conversion particles 12 may include a metal oxide. In detail, the light conversion particles include at least one metal oxide of titanium dioxide (TiO2), iron oxide (Fe2O3), zirconium oxide (ZrO2), indium oxide (In2O3), tin oxide (SnO2), and aluminum oxide (Al2O3).

The metal oxide may also have a yoke-shell structure like the carbon black described above. Accordingly, by reducing the difference in specific gravity between the light conversion particles including the metal oxide and the dispersion, it is possible to improve the dispersibility of the light conversion particles.

In addition, in the case of the metal oxide, there are more functional groups such as a hydroxyl group (—OH) and a carboxyl group (—COOH) on the surface compared to carbon black. Thereby it possible to easily coat the surface charge coating layer, that is, silane coating.

Therefore, when the metal oxide is used, a separate surface modification process is not required, unlike carbon black. In addition, the amount of surface charge can be improved by facilitating the silane coating by a functional group such as a hydroxyl group (—OH) or a carboxyl group (—COOH).

Figure 17:
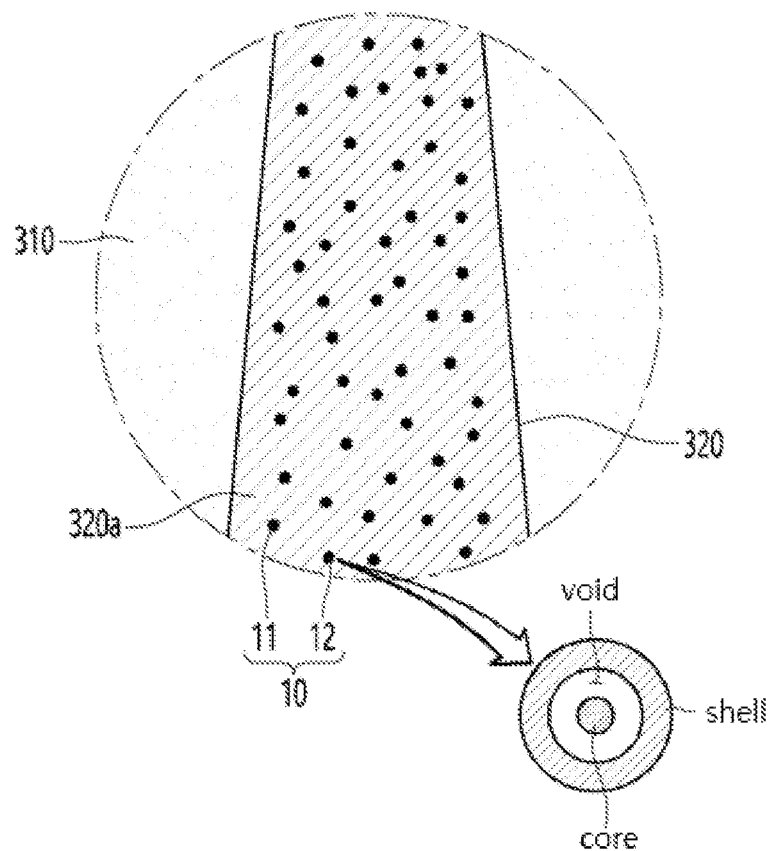

Referring to FIG. 17, the light conversion particles of the light route control member according to another embodiment may include first particles 11 and second particles 12 having different shapes and/or types. In detail, the light conversion particles may include a first particle 11 including a spherical light conversion particle and a second particle 12 including a yoke-shell structure light conversion particle.

For example, the light conversion particles may include carbon black, and the light conversion particles may include spherical carbon black and carbon black having a yoke-shell structure.

The first particles 11 and the second particles 12 may be mixed in different weight % depending on the specific gravity of the dispersion.

For example, when the specific gravity of the dispersion is less than 1, the second particle 12 may include more than the first particle 11. That is, in order to reduce the overall specific gravity of the light conversion particles, the second particles 12 may be included more than the first particles 11. In detail, the first particles 11 may be included in an amount of about 30% to less than 50% by weight based on the total particles, and the second particles 12 may be included in an amount of about 50% to about 70% by weight based on the total particles. may be included.

In addition, when the specific gravity of the dispersion is 1 or more, the first particles 11 may be included more than the second particles 12. That is, in order to increase the overall specific gravity of the light conversion particles, the first particles 11 may be included more than the second particles 12. In detail, the first particle 11 may be included in an amount of about 60% to less than 90% by weight with respect to the total particles, and the second particle 12 is about 10% to about 40% by weight based on the total particles. may be included.

Accordingly, the light route control member according to another embodiment controls the mixing ratio of the light conversion particles according to the specific gravity of the dispersion, thereby eliminating the selection limitation according to the specific gravity of the dispersion. In addition, by dispersing the light conversion particles having an appropriate specific gravity, it is possible to improve the dispersibility of the light conversion particles.

Meanwhile, the light conversion particles may include at least one of carbon black and a metal oxide. The metal oxide may include at least one metal oxide of titanium dioxide (TiO2), iron oxide (Fe2O3), zirconium oxide (ZrO2), indium oxide (In2O3), tin oxide (SnO2), and aluminum oxide (Al2O3).

That is, both the first particle 11 and the second particle 12 may include carbon black. Alternatively, both the first particle 11 and the second particle 12 may include a metal oxide. Alternatively, the first particle 11 may include carbon black, and the second particle 12 may include a metal oxide. Alternatively, the first particle 11 may include a metal oxide, and the second particle 12 may include carbon black.

Figure 18:
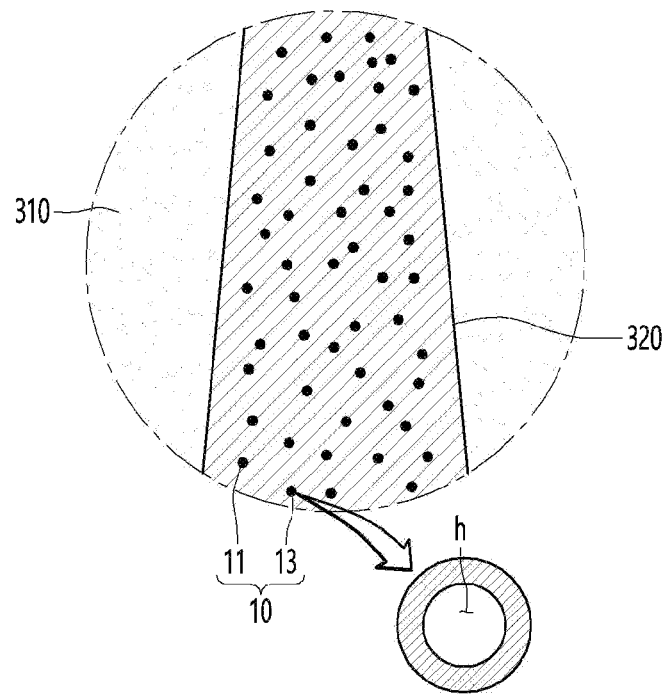

Referring to FIG. 18, the light conversion particles of the light route control member according to another embodiment may include first particles 11 and third particles 13 having different shapes and/or types. In detail, the light conversion particles may include a first particle 11 including spherical light conversion particles and a third particle 13 including light conversion particles having a hollow structure in which a hole is formed inside the particle.

For example, the light conversion particles may include carbon black, and the light conversion particles may include spherical carbon black and carbon black with hollow.

Here, as shown in FIG. 18, the hollow structure may be defined as a hollow shape, that is, a particle structure in which hollow holes h are formed therein.

The specific gravity of the third particle 13 of the hollow structure and the first particle 11 of the spherical shape may be different from each other. In detail, the specific gravity of the third particle 13 may be smaller than the specific gravity of the first particle 11. In detail, the specific gravity of the third particle 13 may be about 1.2 to 1.9.

The first particles 11 and the third particles 13 may be mixed in different weight %.

In detail, the first particles 11 may be mixed in a smaller amount by weight compared to the third particles 13. In detail, the first particle 11 may be included in an amount of about 1 wt % to 45 wt % based on the total particles. In addition, the third particle 13 may be included in an amount of about 55% to 99% by weight based on the total particles.

The weight % ratio of the first particles 11 and the third particle 13 is a value defined in consideration of the total specific gravity and light absorption of the electrophoretic particles. When the weight % is out of the above ratio, the movement speed is reduced due to sedimentation of the particles, and the light absorption rate of the particles is reduced, so that the light blocking rate may be reduced.

Accordingly, the light path control member according to another embodiment mixes and disperses the light conversion particles in a ratio appropriate to specific gravity and light absorption, thereby improving the dispersibility and light absorption of the light conversion particles.

Meanwhile, the light conversion particles may include at least one of carbon black and a metal oxide. The metal oxide may include at least one metal oxide of titanium dioxide (TiO2), iron oxide (Fe2O3), zirconium oxide (ZrO2), indium oxide (In2O3), tin oxide (SnO2), and aluminum oxide (Al2O3).

That is, both the first particle 11 and the third particle 13 may include carbon black. Alternatively, both the first particle 11 and the third particle 13 may include a metal oxide. Alternatively, the first particle 11 may include carbon black, and the third particle 13 may include a metal oxide. Alternatively, the first particle 11 may include a metal oxide, and the third particle 13 may include carbon black.

Figure 19:
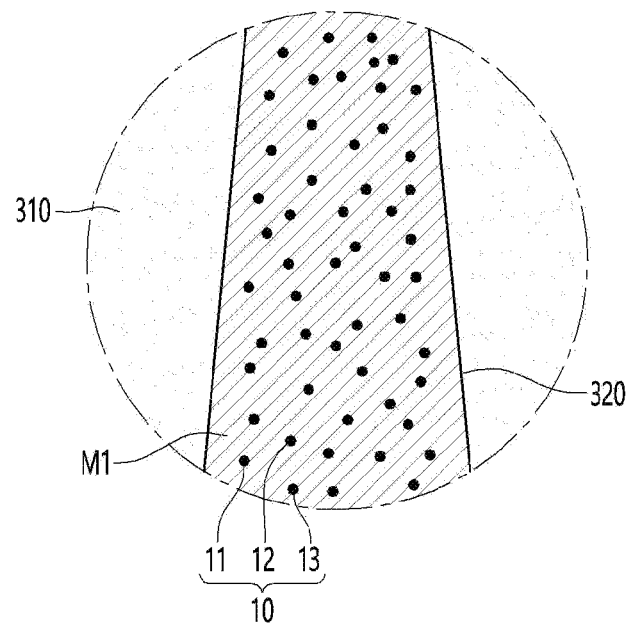

Referring to FIG. 19, the light conversion particles of the light route control member according to another embodiment include first particles 11, second particles 12, and third particles 13 having different shapes and/or types. In detail, the light conversion particles include a first particle 11 including a spherical light conversion particle, a second particle 12 including a yoke-shell structure light conversion particle, and a third particle 13 including a hollow structure light conversion particle.

For example, the light conversion particles may include carbon black, and the light conversion particles may include carbon black having a spherical shape, carbon black having a yoke-shell structure, and carbon black having a hollow structure.

The first particle 11, the second particle 12, and the third particle 13 may have different specific gravity.

For example, the specific gravity of the first particle 11 may be 1.8 to 7.9, the specific gravity of the second particle 12 may be 0.6 to 1.5, and the specific gravity of the third particle 13 may be 1.2 to 1.9.

In addition, the first particles 11, the second particles 12, and the third particles 13 may be mixed in different weight %.

In detail, the first particle 11 may be mixed in a lower weight % than that of the second particle 12 and the third particle 13. In addition, the third particles 13 may be mixed in a smaller amount by weight compared to the second particles 12.

In detail, the weight % ratio of the first particle 11, the second particle 12, and the third particle 13 may be 1:1.5:2.5 to 1:2:3.

The weight % ratio of the first particles 11 and the third particle 13 is a value defined in consideration of the total specific gravity and light absorption of the electrophoretic particles. When the weight % is out of the above ratio, the movement speed is reduced due to sedimentation of the particles, and the light absorption rate of the particles is reduced, so that the light blocking rate may be reduced.

Accordingly, the light path control member according to another embodiment mixes and disperses the light conversion particles in a ratio appropriate to specific gravity and light absorption, thereby improving the dispersibility and light absorption of the light conversion particles.

Meanwhile, the light conversion particles may include at least one of carbon black and a metal oxide. The metal oxide may include at least one metal oxide of titanium dioxide (TiO2), iron oxide (Fe2O3), zirconium oxide (ZrO2), indium oxide (In2O3), tin oxide (SnO2), and aluminum oxide ($Al_2O_3$).

That is, the first particle 11, the second particle 12, and the third particle 13 may all include carbon black. Alternatively, the first particle 11, the second particle 12, and the third particle 13 may all include a metal oxide. Alternatively, the first particle 11 may include carbon black, and the second particle 12 and the third particle 13 may include a metal oxide. Alternatively, the first particle 11 may include a metal oxide, and the second particle 12 and the third particle 13 may include carbon black. In addition, the first particle 11 and the second particle 12 may include carbon black, and the third particle 13 may include a metal oxide. In addition, the first particle 11 and the second particle 12 may include a metal oxide, and the third particle 13 may include carbon black. In addition, the first particle 11 and the third particle 13 may include carbon black, and the second particle 12 may include a metal oxide. In addition, the first particle 11 and the third particle 13 may include a metal oxide, and the second particle 13 may include carbon black.

The light route control member according to the embodiment may control the specific gravity of the electrophoretic particles included in the receiving unit.

That is, the receiving unit according to the embodiment may reduce the difference in specific gravity between the electrophoretic particles and the dispersion by using a single particle or at least two or more mixed particles having different shapes and types.

Accordingly, it is possible to inhibit the electrophoretic particles from being agglomerated with each other due to the difference in specific gravity between the electrophoretic particles and the dispersion. In addition, by reducing the difference in specific gravity between the electrophoretic particles and the dispersion, it is possible to increase the speed at which the electrophoretic particles move in the dispersion when a voltage is applied to the light route control member. Accordingly, the light route control member according to the embodiment may have improved driving characteristics.

Hereinafter, a method of manufacturing a light route control member according to an embodiment will be described with reference to FIGS. 20 to 27.

Figure 20:
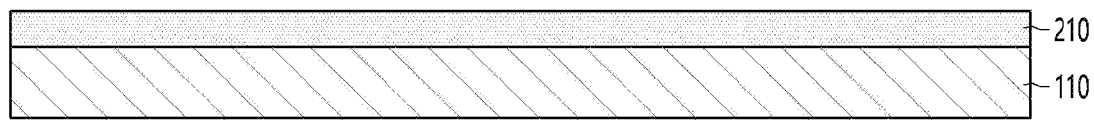
FIGS. 20 to 27 are views for describing a method of manufacturing a light route control member according to an embodiment.

First, referring to FIG. 20, an electrode material forming a first substrate 110 and a first electrode is prepared. Subsequently, the electrode material may be formed on one surface of the first substrate 110 by a coating or deposition process. In detail, the electrode material may be formed on the entire surface of the first substrate 110. Accordingly, a first electrode 210 formed as a surface electrode may be formed on the first substrate 110.

Figure 21:
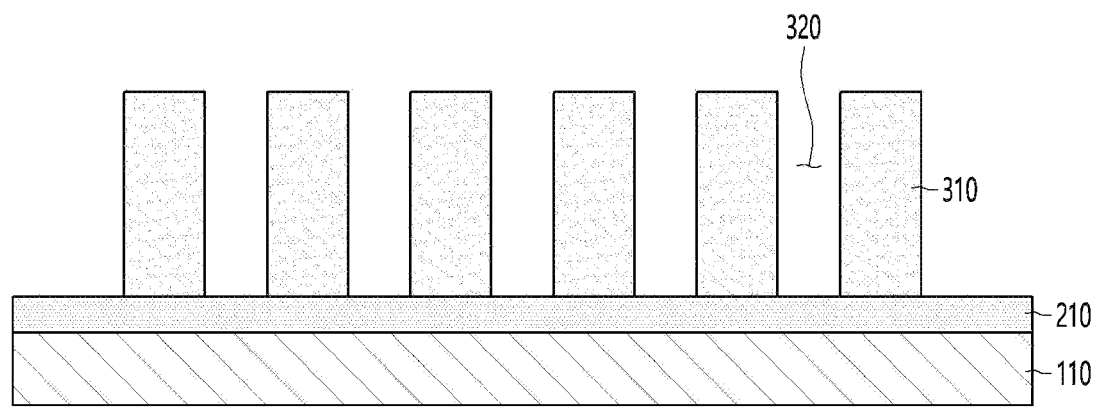

Subsequently, referring to FIG. 21, a resin layer may be formed by applying a resin material on the first electrode 210. In detail, the resin layer may be formed by applying a urethane resin or an acrylic resin on the first electrode 210.

Subsequently, a pattern part may be formed on the resin layer using a mold. In detail, holes or grooves are formed in the resin layer by imprinting the mold, and accordingly, a partition wall unit may be formed by the remaining resin layer. That is, the partition wall unit 310 and the receiving unit 320 described above may be formed on the resin layer.

Figure 22:
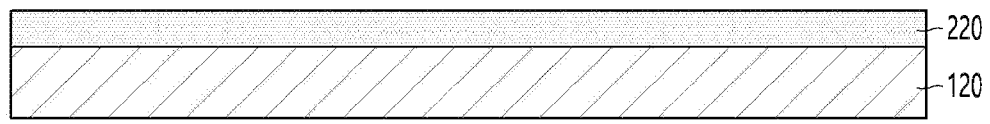

Subsequently, referring to FIG. 22, an electrode material forming a second substrate 120 and a second electrode is prepared. Subsequently, the electrode material may be formed on one surface of the second substrate 120 by a coating or deposition process. In detail, the electrode material may be formed on the entire surface of the second substrate 120. Accordingly, a second electrode 220 formed as a surface electrode may be formed on the second substrate 120.

Figure 23:
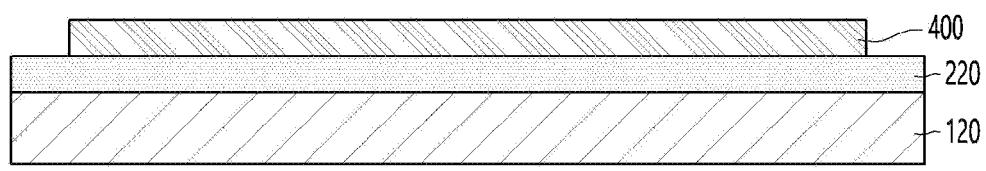

Subsequently, referring to FIG. 23, an adhesive layer 400 may be formed by applying an adhesive material on the second electrode 220. The adhesive layer 400 may be formed on a partial region of the second electrode 220.

Figure 24:
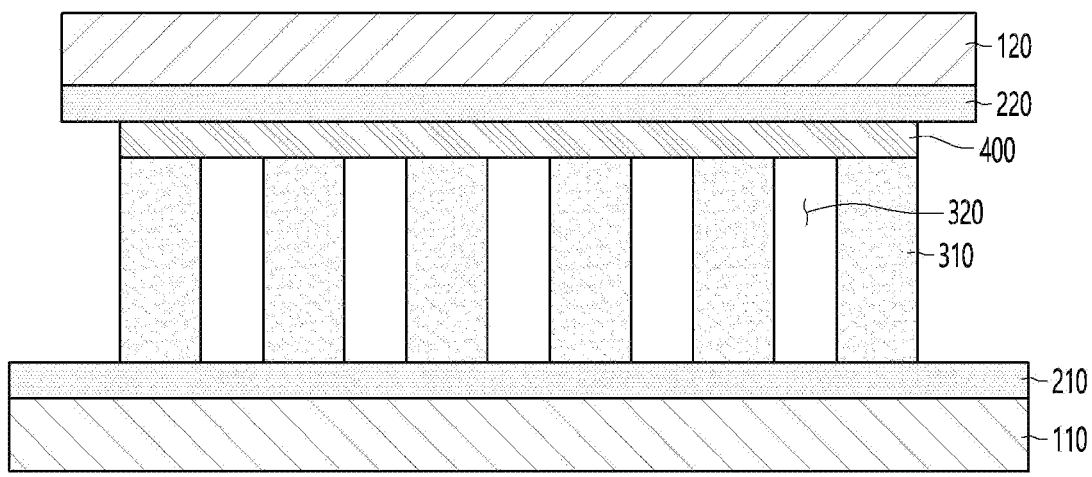
Figure 24:
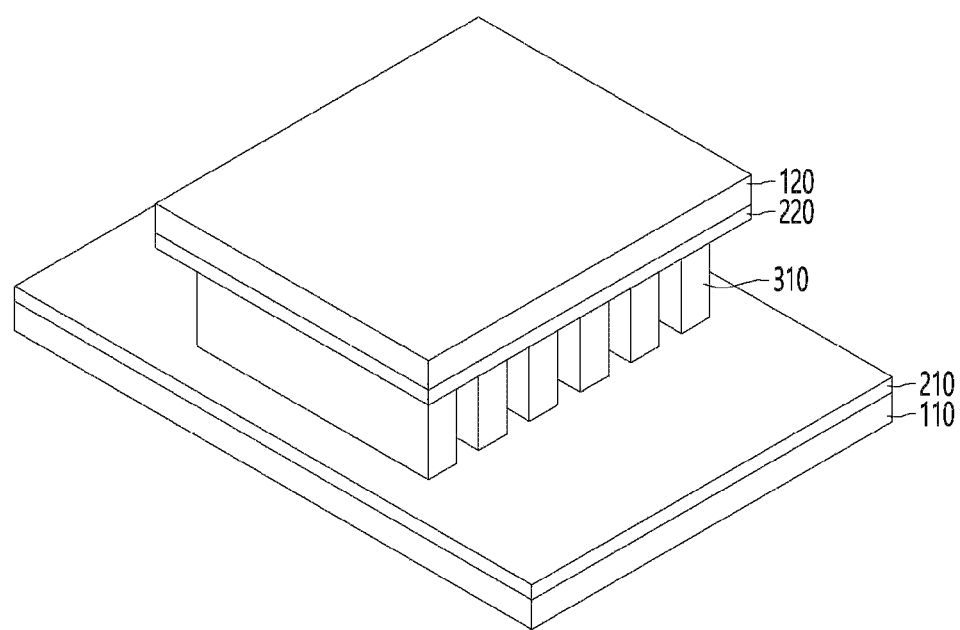

Subsequently, referring to FIG. 24, the first substrate 110 and the second substrate 120 manufactured in advance may be adhered. In detail, the first substrate 110 and the second substrate 120 may be adhered to each other through the adhesive layer 400 on the second substrate 120.

In this case, the first substrate 110 and the second substrate 120 may be adhered in different directions. In detail, the first substrate 110 and the second substrate 120 may be adhered to each other so that a long side direction of the first substrate 110 and a short side direction of the second substrate 120 overlap each other.

Figure 25:
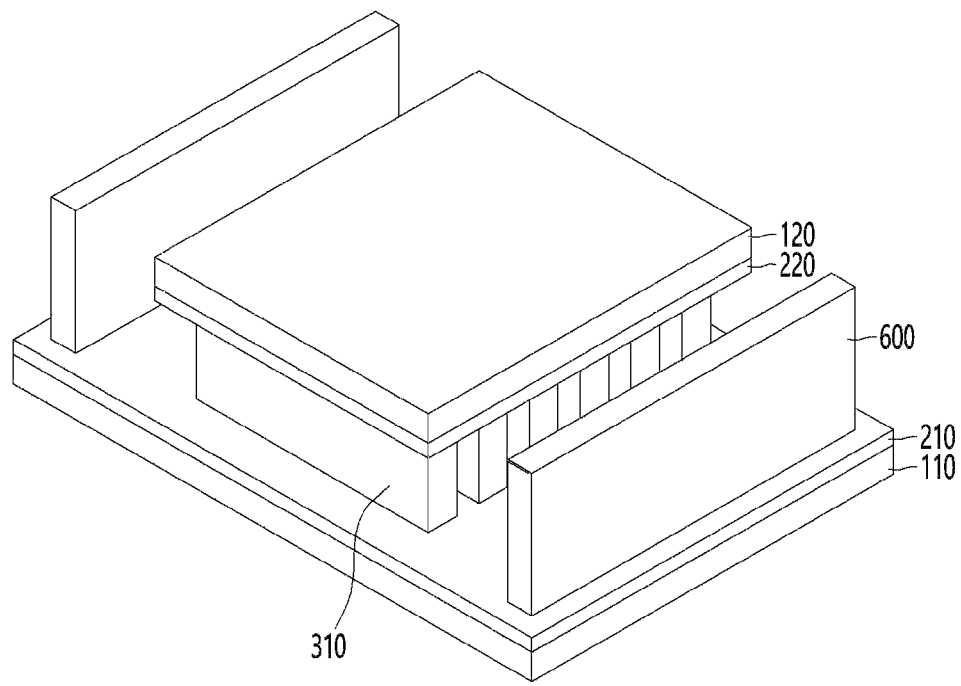

Subsequently, referring to FIG. 25, a dam part 600 may be formed on the first substrate 110. In detail, the dam part 600 may be disposed above and below the receiving unit 320 disposed on the first substrate 110. That is, the dam part 600 may be disposed so that the receiving unit 320 is disposed between the dam part 600.

Figure 26:
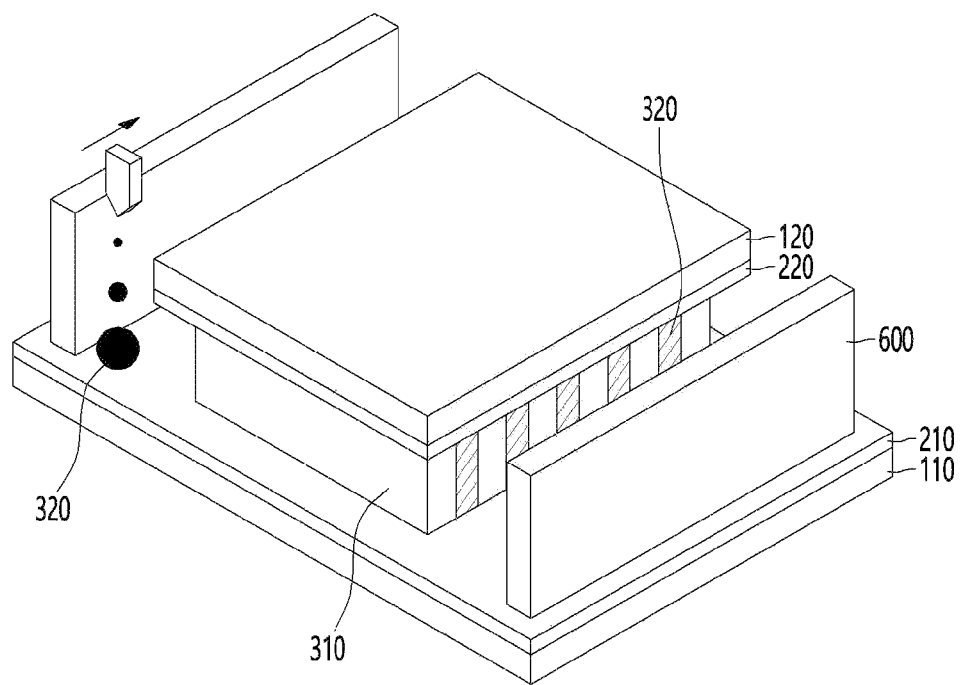

Subsequently, referring to FIG. 26, a light conversion material may be injected between the receiving unit 320, that is, the partition wall units 310. In detail, a light conversion material in which light absorbing particles such as carbon black or the like are dispersed in an electrolyte solvent containing a paraffinic solvent may be injected between the receiving unit 320, that is, between the partition wall units. Accordingly, the partition wall unit 310 described above may be formed between the receiving units 320.

Figure 27:
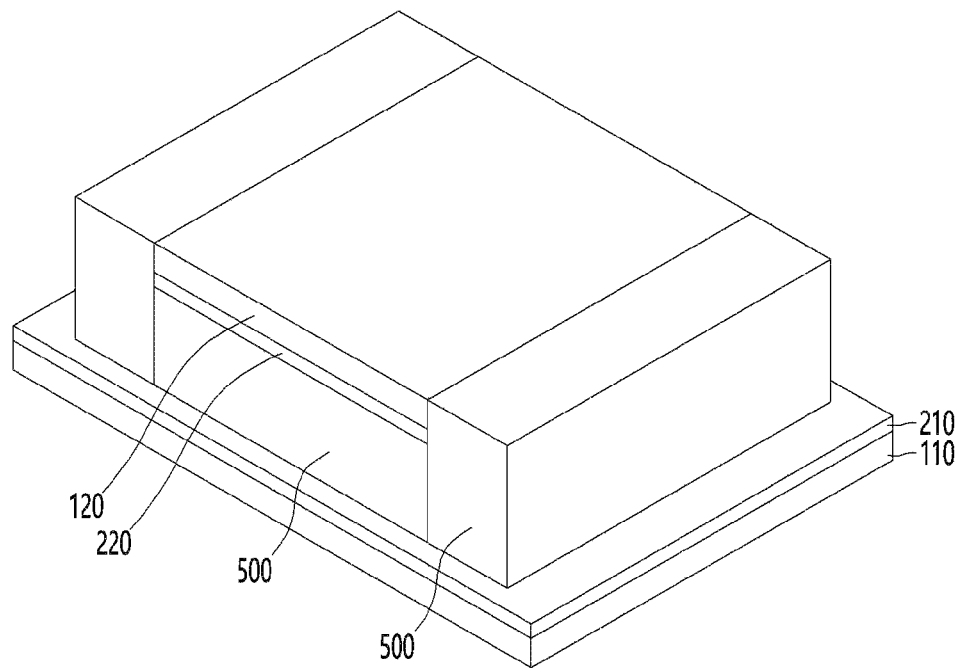

Subsequently, referring to FIG. 27, the light conversion material inside the receiving unit may be sealed from the outside by forming a sealing part 500 in the lateral direction of the receiving unit 320. Subsequently, a final light route control member may be formed by cutting the first substrate 110.

Hereinafter, referring to FIGS. 28 to 30, a display device and a display apparatus to which a light route control member according to an embodiment is applied will be described.

Figure 28:
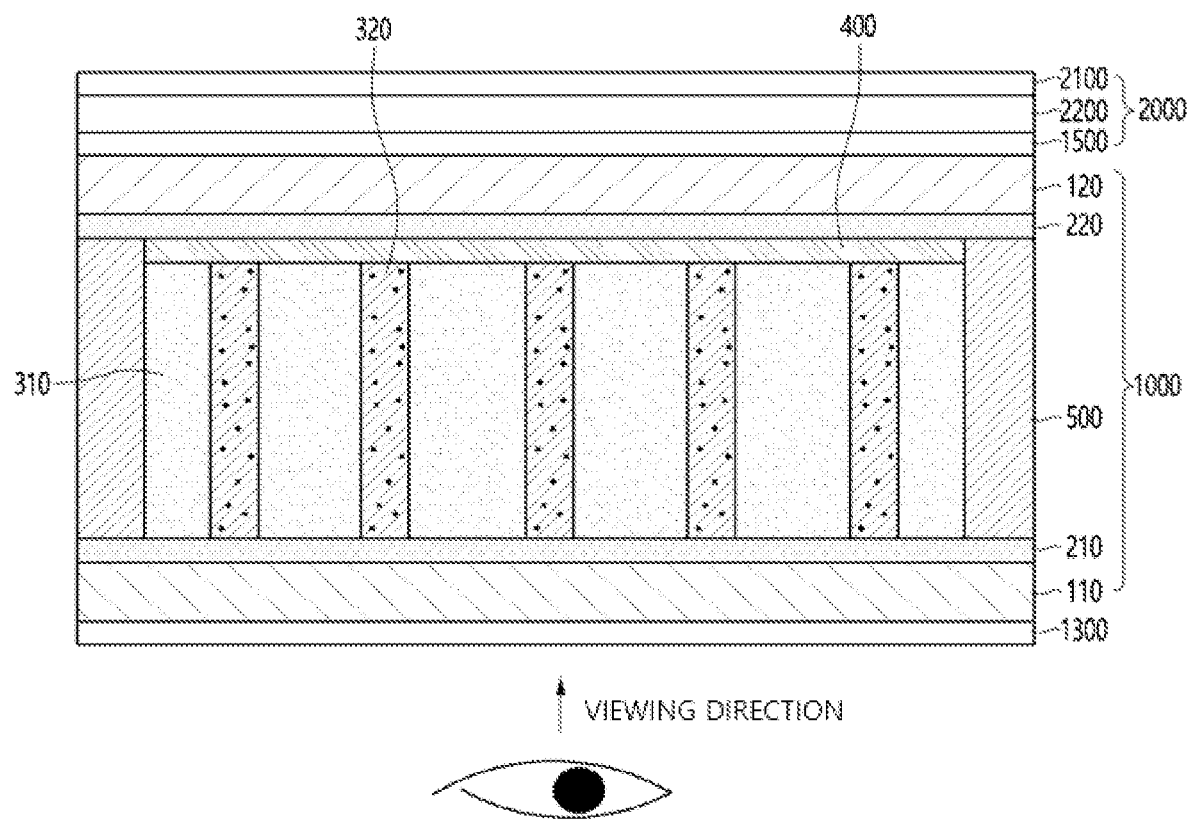
FIG. 28 is a cross-sectional view of a display device to which a light route control member according to an embodiment is applied.

Referring to FIG. 28, a light route control member 1000 according to an embodiment may be disposed on a display panel 2000.

The display panel 2000 and the light route control member 1000 may be disposed to be adhered to each other. For example, the display panel 2000 and the light route control member 1000 may be adhered to each other via an adhesive layer 1500. The adhesive layer 1500 may be transparent. For example, the adhesive layer 1500 may include an adhesive or an adhesive layer containing an optical transparent adhesive material.

The adhesive layer 1500 may include a release film. In detail, when adhering the light route control member and the display panel, the light route control member and the display panel may be adhered after the release film is removed.

The display panel 2000 may include a first substrate 2100 and a second substrate 2200. When the display panel 2000 is a liquid crystal display panel, the display panel 2000 may be formed in a structure in which the first substrate 2100 including a thin film transistor (TFT) and a pixel electrode and the second substrate 2200 including color filter layers are bonded with a liquid crystal layer interposed therebetween.

In addition, the display panel 2000 may be a liquid crystal display panel of a color filter on transistor (COT) structure in which a thin film transistor, a color filter, and a black matrix are formed at the first substrate 2100 and the second substrate 2200 is bonded to the first substrate 2100 with the liquid crystal layer interposed therebetween. That is, a thin film transistor may be formed on the first substrate 2100, a protective film may be formed on the thin film transistor, and a color filter layer may be formed on the protective film. In addition, a pixel electrode in contact with the thin film transistor may be formed on the first substrate 2100. At this point, in order to improve an aperture ratio and simplify a masking process, the black matrix may be omitted, and a common electrode may be formed to function as the black matrix.

In addition, when the display panel 2000 is the liquid crystal display panel, the display device may further include a backlight unit providing light from a rear surface of the display panel 2000.

Alternatively, when the display panel 2000 is an organic light emitting display panel, the display panel 2000 may include a self-luminous element that does not require a separate light source. In the display panel 2000, a thin film transistor may be formed on the first substrate 2100, and an organic light emitting element in contact with the thin film transistor may be formed. The organic light emitting element may include an anode, a cathode, and an organic light emitting layer formed between the anode and the cathode. Further, the second substrate 2200 configured to function as an encapsulation substrate for encapsulation may further be included on the organic light emitting element.

Furthermore, although not shown in drawings, a polarizing plate may be further disposed between the light route control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting display panel, the polarizing plate may be the external light reflection preventive polarizing plate.

In addition, an additional functional layer 1300 such as an anti-reflection layer, an anti-glare, or the like may be further disposed on the light route control member 1000. Specifically, the functional layer 1300 may be adhered to one surface of the substrate of the light route control member. Although not shown in drawings, the functional layer 1300 may be adhered to the base 100 of the light route control member via an adhesive layer. In addition, a release film for protecting the functional layer may be further disposed on the functional layer 1300.

Further, a touch panel may be further disposed between the display panel and the light route control member.

Although it is shown in the drawings that the light route control member is disposed at an upper portion of the display panel, but the embodiment is not limited thereto, and the light route control member may be disposed at various positions such as a position in which light is adjustable, that is, a lower portion of the display panel, between a second substrate and a first substrate of the display panel, or the like.

Figure 29:
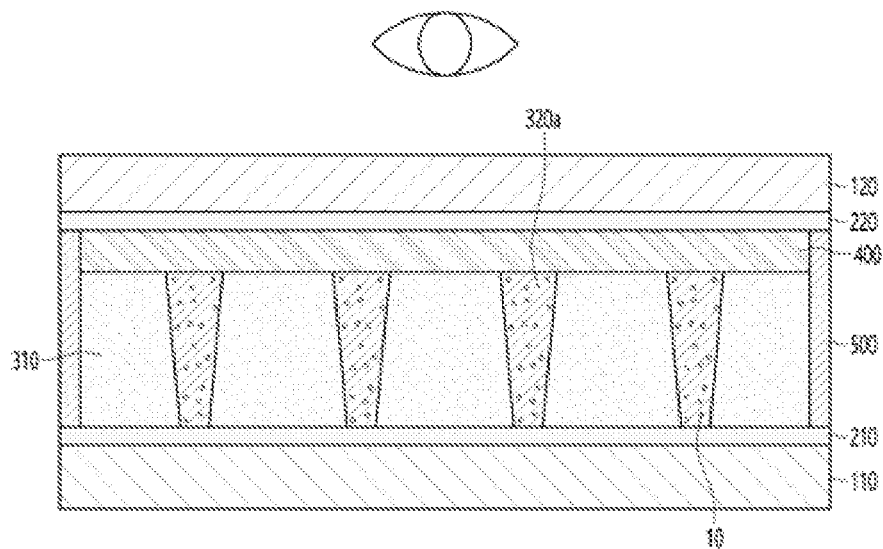
FIGS. 29 and 30 are views for describing one embodiment of the display device to which the light route control member according to the embodiment is applied.
Figure 29:
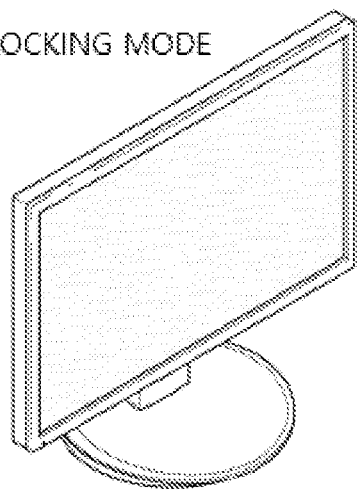
Figure 30:
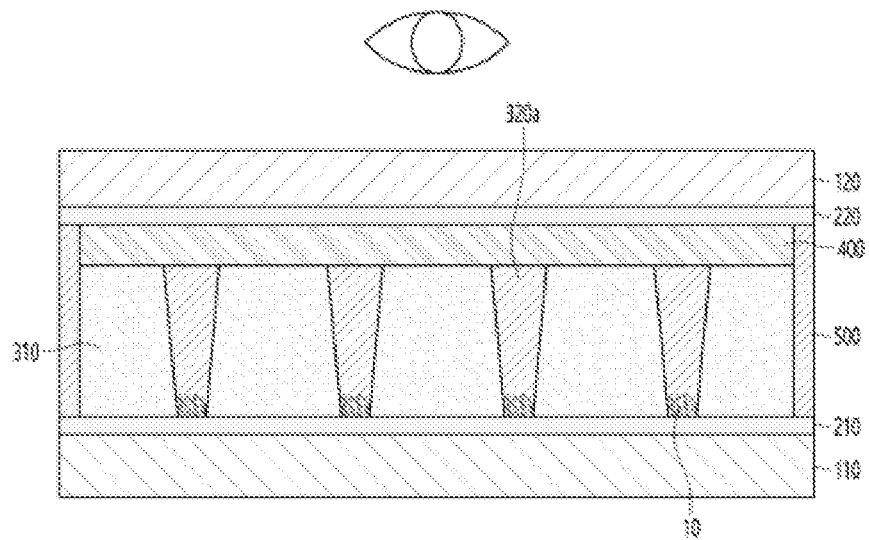
Figure 30:
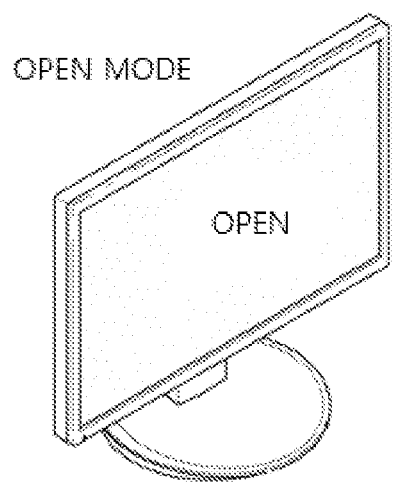

Referring to FIGS. 29 and 30, the light route control member according to the embodiment may be applied to a vehicle.

Referring to FIGS. 29 and 30, the light route control member according to the embodiment may be applied to a display device that displays a display.

For example, when power is not applied to the light route control member as shown in FIG. 29, the receiving unit functions as the light blocking part, so that the display device is driven in a light blocking mode, and when power is applied to the light route control member as shown in FIG. 30, the receiving unit functions as the light transmitting part, so that the display device may be driven in an open mode.

Accordingly, a user may easily drive the display device in a privacy mode or a normal mode according to application of power.

In addition, although not shown in the drawings, the display device to which the light route control member according to the embodiment is applied may also be applied inside the vehicle.

For example, the display device including the light route control member according to the embodiment may display a video confirming information of the vehicle and a movement route of the vehicle. The display device may be disposed between a driver seat and a passenger seat of the vehicle.

In addition, the light route control member according to the embodiment may be applied to a dashboard that displays a speed, an engine, an alarm signal, and the like of the vehicle.

Furthermore, the light route control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. A light route control member comprising:
   a first substrate;
   a first electrode disposed on the first substrate;
   a second substrate disposed on the first substrate;
   a second electrode disposed under the second substrate; and
   a light conversion unit disposed between the first electrode and the second electrode,
   wherein the light conversion unit includes a partition wall unit and a receiving unit alternately disposed,
   wherein the receiving unit changes light transmittance according to application of a voltage,
   wherein the receiving unit includes a dispersion and a plurality of light conversion particles dispersed in the dispersion,
   wherein the light conversion particle includes a core and a shell disposed on the outer surface of the core,
   wherein at least one light conversion particle of the plurality of light conversion particles includes a void disposed between the core and the shell,
   wherein a specific gravity of the light conversion particles is 0.6 to 1.5, and
   wherein the light conversion particles include first particles and second particles having different specific gravities.

2. The light route control member of claim 1, wherein the light conversion particles include third particles.

3. The light route control member of claim 2, wherein the first to third particles have different specific gravities.

4. The light route control member of claim 3
   wherein each of the first particles includes a spherical shape,
   wherein each of the second particles includes a yolk-shell shape, and
   wherein each of the third particles includes a hollow shape.

5. The light route control member of claim 3
   wherein when the voltage is applied, the first to third particles move in a same direction within the receiving unit and aggregate in one region of the receiving unit.

6. The light route control member of claim 1, wherein a specific surface area of the light conversion particles is 300 m$^2$/g to 5000 m$^2$/g.

7. The light route control member of claim 1, wherein the light conversion particles include at least one of carbon black and a metal oxide.

8. The light route control member of claim 1, wherein each of the first particles comprises a spherical shape,
   wherein each of the second particles comprises a yolk-shell shape, and
   wherein the first particles and the second particles include in different weight % depending on a specific gravity of the dispersion.

9. The light route control member of claim 8, wherein when the specific gravity of the dispersion is less than 1, the first particles include in an amount of about 30% to less than 50% by weight based on total particles, and the second particles include in an amount of 50% to about 70% by weight based on the total particles,
   wherein when the specific gravity of the dispersion is 1 or more, the first particles include in an amount of 60 wt % to less than 90 wt % based on the total particles, and the second particles include in an amount of 10 wt % to about 40 wt % based on the total particles.

10. The light route control member of claim 9, wherein a weight % ratio of the first particles, the second particles, and the third particles is 1:1.5:2.5 to 1:2:3.

11. The light route control member of claim 10, wherein the first particles and the third particles include at least one of carbon black, titanium dioxide (TiO2), iron oxide (Fe2O3), zirconium oxide (ZrO2), indium oxide (In2O3), tin oxide (SnO2), or aluminum oxide (Al2O3).

12. A light route control member comprising:
   a first substrate;
   a first electrode disposed on the first substrate;
   a second substrate disposed on the first substrate;
   a second electrode disposed under the second substrate; and
   a light conversion unit disposed between the first electrode and the second electrode,
   wherein the light conversion unit includes a partition wall unit and a receiving unit alternately disposed,
   wherein the receiving unit changes light transmittance according to application of a voltage,
   wherein the receiving unit includes a dispersion and a plurality of light conversion particles dispersed in the dispersion,
   wherein each light conversion particle includes a core and a shell disposed on the outer surface of the core,
   wherein at least one light conversion particle of the plurality of light conversion particles includes a void disposed between the core and the shell,
   wherein a specific gravity of the light conversion particles is 0.6 to 1.5,
   wherein the light conversion particles include first particles and third particles having different specific gravities,
   wherein each of the first particles comprises a spherical shape, and
   wherein each of the third particles includes a hollow shape.

13. The light route control member of claim 12, wherein the first particle comprises 1% to 45% by weight of total particles, and
   wherein the third particle comprises about 55% to 99% by weight of the total particles.

* * * * *